(12) United States Patent
Ram et al.

(10) Patent No.: US 11,506,951 B2
(45) Date of Patent: Nov. 22, 2022

(54) FORWARD-BIASED MODULATOR FOR CRYOGENIC OPTICAL READOUT

(71) Applicant: Massachusetts Institute of Technology, Cambridge, MA (US)

(72) Inventors: Rajeev J. Ram, Arlington, MA (US); Dodd Joseph Gray, San Francisco, CA (US); Amir H. Atabaki, San Francisco, CA (US); Marc De Cea Falco, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/091,905

(22) Filed: Nov. 6, 2020

(65) Prior Publication Data

US 2021/0208470 A1     Jul. 8, 2021

Related U.S. Application Data

(60) Provisional application No. 62/957,493, filed on Jan. 6, 2020.

(51) Int. Cl.
*G02F 1/225* (2006.01)
*G02F 1/21* (2006.01)
*G02F 1/01* (2006.01)

(52) U.S. Cl.
CPC .......... *G02F 1/2257* (2013.01); *G02F 1/0102* (2013.01); *G02F 1/0123* (2013.01); *G02F 1/212* (2021.01); *G02F 2202/10* (2013.01)

(58) Field of Classification Search
CPC ...... G02F 1/2257; G02F 1/212; G02F 1/0102; G02F 1/0123; G02F 2202/10
See application file for complete search history.

(56) References Cited

U.S. PATENT DOCUMENTS 10,302,867 B1    5/2019  Goutzoulis et al.
2011/0293216 A1  12/2011 Lipson et al.

OTHER PUBLICATIONS

De Cea, M., Wollman, E.E., Atabaki, A.H. et al. Photonic Readout of Superconducting Nanowire Single Photon Counting Detectors. Sci Rep 10, 9470 (2020). https://doi.org/10.1038/s41598-020-65971-5 (Year: 2020).*

(Continued)

*Primary Examiner* — Peter Radkowski
(74) *Attorney, Agent, or Firm* — Smith Baluch LLP

(57) ABSTRACT

Optical read-out of a cryogenic device (such as a superconducting logic or detector element) can be performed with a forward-biased optical modulator that is directly coupled to the cryogenic device without any intervening electrical amplifier. Forward-biasing at cryogenic temperatures enables very high modulation efficiency (1,000-10,000 pm/V) of the optical modulator, and allows for optical modulation with millivolt driving signals and microwatt power dissipation in the cryogenic environment. Modulated optical signals can be coupled out of the cryostat via an optical fiber, reducing the thermal load on the cryostat. Using optical fiber instead of electrical wires can increase the communication bandwidth between the cryogenic environment and room-temperature environment to bandwidth densities as high as Tbps/mm$^2$ using wavelength division multiplexing. Sensitive optical signals having higher robustness to noise and crosstalk, because of their immunity to electromagnetic interference, can be carried by the optical fiber.

26 Claims, 16 Drawing Sheets

(56) References Cited

OTHER PUBLICATIONS

Rui Lin Chao, Jin Wei Shi, Aditya Jain, Takako Hirokawa, Akhilesh S.P. Khope, Clint Schow, J.E. Bowers, Roger Helkey, and James F. Buckwalter, "Forward bias operation of silicon photonic Mach Zehnder modulators for RF applications," Opt. Express 25, 23181-23190 (2017) (Year: 2017).*
Zhang Wan-Rong, Li Zhi-Guo, Luo Jin-Sheng, Chang Yao-Hai, Chen Jian-Xin and Shen Guang-Di, "Carrier freeze-out in strained p-Si/sub 1-x/Ge/sub x/ layers," 1998 5th International Conference on Solid-State and Integrated Circuit Technology. Proceedings (Year: 1998).*
F. Eltes et al., "First cryogenic electro-optic switch on silicon with high bandwidth and low power tunability," 2018 IEEE International Electron Devices Meeting (IEDM), 2018, pp. 23.1.1-23.1.4, doi: 10.1109/IEDM.2018.8614511. (Year: 2018).*
Timurdogan, E., Sorace-Agaskar, C., Sun, J. et al. An ultralow power athermal silicon modulator. Nat Commun 5, 4008 (2014). https://doi.org/10.1038/ncomms5008 (Year: 2014).*
Kim, Y., Takenaka, M., Osada, T. et al. Strain-induced enhancement of plasma dispersion effect and free-carrier absorption in SiGe optical modulators. Sci Rep 4, 4683 (2014). https://doi.org/10.1038/srep0468 (Year: 2014).*
Myoung-Gyun Suh, Qi-Fan Yang, and Kerry J. Vahala, Phonon-Limited-Linewidth of Brillouin Lasers at Cryogenic Temperatures, Phys. Rev. Lett. 119, 143901—Published Oct. 2, 2017 (Year: 2017).*
Martinis, John M., Superconducting Qubits and the Physics of Josephson Junctions, Course 1, NIST, arXiv: cond-mat/0402415v1 [cond-mat.supr-con] Feb. 16, 2004 (Year: 2004).*
S. Palermo et al., "Silicon Photonic Microring Resonator-Based Transceivers for Compact WDM Optical Interconnects," 2015 IEEE Compound Semiconductor Integrated Circuit Symposium (CSICS), 2015, pp. 1-4, doi: 10.1109/CSICS.2015.7314523. (Year: 2015).*
Zhu et al., Superconducting nanowire single-photon detector with integrated impedance-matching taper, arXiv:1811.03991v1 [physics.ins-det] Nov. 9, 2018 (Year: 2018).*
Burke et al., Quantitative Theory of Nanowire and Nanotube Antenna Performance, IEEE Transactions on Nanotechnology, vol. 5, No. 4, Jul. 2006 (Year: 2006).*
Yin et al., Measurement-Device-Independent Quantum Key Distribution Over a 404 km Optical Fiber, Phys. Rev. Lett. 117, 190501—Published Nov. 2, 2016 (Year: 2016).*
Palomera-Arias, Rogelio, PIN Diode Switch Circuit for Short Time High Current Pulse Signal, Thesis, Master of Science in Electrical Engineering, MIT, 1998 (Year: 1998).*
Gui-Rong Zhou. et al., Effect of carrier lifetime on forward-biased silicon Mach-Zehnder modulators. Opt. Express 16, 5218-5226 (2008). (Year: 2008).*
Macom, Application Note Ag312, Design with PIN Diodes, 2015 (Year: 2015).*
Wade, Mark, Vladimir Stojanovic, Rajeev Jagga Ram, Luca Alloatti, and Milos Popovic. "Photonics Design Tool for Advanced CMOS Nodes." IET Optoelectronics 9, No. 4 (Aug. 1, 2015): 163-67. (Year: 2015).*
Alloatti, L. and Ram, R. J. "Resonance-Enhanced Waveguide-Coupled Silicon-Germanium Detector."Applied Physics Letters 108, 7 (Feb. 2016) (Year: 2016).*
De Souza, Michelly & Rue, Bertrand & Flandre, Denis & Pavanello, Marcelo. (2010). Thin-Film Lateral SOI PIN Diodes for Thermal Sensing Reaching the Cryogenic Regime. Journal of Integrated Circuits and Systems. 5. 10.29292/jics.v5i2.323. (Year: 2010).*
Alloatti et al., "High-speed modulator with interleaved junctions in zero-change CMOS photonics." Applied Physics Letters 108.13 (2016): 131101. 4 pages.
Bardin et al., "A high-speed cryogenic SiGe channel combiner IC for large photon-starved SNSPD arrays." 2013 EEE Bipolar/BiCMOS Circuits and Technology Meeting (BCTM). IEEE, 2013.

Bogaerts et al., "Silicon microring resonators." Laser & Photonics Reviews 6.1 (2012): 47-73.
Boroson et al., "Overview and results of the lunar laser communication demonstration." Free-Space Laser Communication and Atmospheric Propagation XXVI. vol. 8971. International Society for Optics and Photonics, 2014. 12 pages.
Bunz et al., "An optically coupled superconducting analog to digital converter." IEEE transactions on applied superconductivity 7.2 (1997): 2972-2974.
Cahall et al., "Scalable cryogenic readout circuit for a superconducting nanowire single-photon detector system." Review of Scientific Instruments 89.6 (2018): 063117. 8 pages.
Clarke et al., "Superconducting quantum bits." Nature 453.7198 (2008): 1031. 12 pages.
De Cea et al., "A thin silicon photonic platform for telecommunication wavelengths." 2017 European Conference on Optical Communication (ECOC). IEEE, 2017. 3 pages.
Eltes et al., "First cryogenic electro-optic switch on silicon with high bandwidth and low power tunability." 2018 IEEE International Electron Devices Meeting (IEDM). IEEE, 2018. 4 pages.
Fink, "High-Frequency Properties of Epitaxial Silicon p-n Junctions at Low Temperatures." Journal of Applied Physics 35.6 (1964): 1883-1889.
Forecasting superconductive electronics technology. The Next Wave 20 (2014). Accessed at https://www.nsa.gov/Portals/70/documents/resources/everyone/digital-media-center/publications/the-next-wave/TNW-20-3.pdf. 39 pages.
Foty, "Impurity ionization in MOSFETs at very low temperatures." Cryogenics 30.12 (1990): 1056-1063.
Gambetta et al., "Building logical qubits in a superconducting quantum computing system." npj Quantum Information 3.1 (2017): 2. 7 pages.
Gehl et al., "Operation of high-speed silicon photonic micro-disk modulators at cryogenic temperatures." Optica 4.3 (2017): 374-382.
Gupta et al., "Low-power high-speed hybrid temperature heterogeneous technology digital data link." IEEE Transactions on Applied Superconductivity 23.3 (2013): 1701806-1701806.
Hadfield et al., "Low-frequency phase locking in high-inductance superconducting nanowires." Applied Physics Letters 87.20 (2005): 203505. 4 pages.
Holmes et al., "Energy-efficient superconducting computing—Power budgets and requirements." IEEE Transactions on Applied Superconductivity 23.3 (2013): 1701610-1701610.
Ichimura et al., "Temperature dependence of carrier recombination lifetime in Si wafers." Journal of the Electrochemical Society 145.9 (1998): 3265-3271.
Joshi et al., "Silicon-photonic clos networks for global on-chip communication." 2009 3rd ACM/IEEE International Symposium on Networks-on-Chip. IEEE, 2009.
Kerman et al., "Electrothermal feedback in superconducting nanowire single-photon detectors." Physical review B 79.10 (2009): 100509. 4 pages.
Khwaja et al., "Low-cost Gaussian beam profiling with circular irises and apertures." Applied optics 58.4 (2019): 1048-1056.
McCaughan, "Readout architectures for superconducting nanowire single photon detectors." Superconductor science & technology 31 (2018). 5 pages.
McKenna et al., "Alignment-free cryogenic optical coupling to an optomechanical crystal." arXiv preprint arXiv:1904.05293 (2019). 6 pages.
Mukhanov et al., "Development of Energy-efficient Cryogenic Optical (ECO) data link." 2013 IEEE 14th International Superconductive Electronics Conference (ISEC). IEEE, 2013. 3 pages.
Natarajan et al., "Superconducting nanowire single-photon detectors: physics and applications." Superconductor science and technology 25.6 (2012): 063001. 17 pages.
Nguyen et al., "Temperature dependence of the radiative recombination coefficient in crystalline silicon from spectral photoluminescence." Applied Physics Letters 104.11 (2014): 112105. 4 pages.
Notaros et al.,"Ultra-efficient CMOS fiber-to-chip grating couplers." 2016 Optical Fiber Communications Conference and Exhibition (OFC). IEEE, 2016. 3 pages.

(56) References Cited

OTHER PUBLICATIONS

Orcutt et al., "Open foundry platform for high-performance electronic-photonic integration." Optics express 20.11 (2012): 12222-12232.
Preston et al., "Performance guidelines for WDM interconnects based on silicon microring resonators." CLEO: 2011—Laser Science to Photonic Applications. IEEE, 2011. 2 pages.
Reed et al., "Silicon optical modulators." Nature photonics 4.8 (2010): 518-526.
Robinson et al., "781 Mbit/s photon-counting optical communications using a superconducting nanowire detector." Optics letters 31.4 (2006): 444-446.
Shaw et al., "Arrays of WSi superconducting nanowire single photon detectors for deep-space optical communications." 2015 Conference on Lasers and Electro-Optics (CLEO). IEEE, 2015. 2 pages.
Soref et al., "Electrooptical effects in silicon." IEEE journal of quantum electronics 23.1 (1987): 123-129.
Sun et al., "Single-chip microprocessor that communicates directly using light." Nature 528.7583 (2015): 534-538.
Timurdogan et al., "An ultralow power athermal silicon modulator." Nature communications 5 (2014): 4008. 11 pages.
Verma et al., "High-efficiency superconducting nanowire single-photon detectors fabricated from MoSi thin-films." Optics express 23.26 (2015): 33792-33801.
Vyhnalek et al., "Performance and characterization of a modular superconducting nanowire single photon detector system for space-to-Earth optical communications links." Free-Space Laser Communication and Atmospheric Propagation XXX. vol. 10524. International Society for Optics and Photonics, 2018. 10 pages.
Wade et al., "A Bandwidth-Dense, Low Power Electronic-Photonic Platform and Architecture for Multi-Tbps Optical I/O." 2018 European Conference on Optical Communication (ECOC). IEEE, 2018. 3 pages.
Wollman et al., "UV superconducting nanowire single-photon detectors with high efficiency, low noise, and 4 K operating temperature." Optics express 25.22 (2017): 26792-26801.
Wuensch et al., "Cryogenic semiconductor amplifier for RSFQ-circuits with high data rates at 4.2 K." IEEE Transactions on Applied Superconductivity 19.3 (2009): 574-579.
Wuensch et al., "Design and development of a cryogenic semiconductor amplifier for interfacing RSFQ circuits at 4.2 K." Superconductor science and technology 20.11 (2007): S356. 7 pages.
Xu et al., "12.5 Gbit/s carrier-injection-based silicon micro-ring silicon modulators." Optics express 15.2 (2007): 430-436.
Xu et al., "Micrometre-scale silicon electro-optic modulator." nature 435.7040 (2005): 325-327.
Zhao et al., "Single-photon imager based on a superconducting nanowire delay line." Nature Photonics 11.4 (2017): 247.
Zou et al., "Ultralow-threshold cryogenic vertical-cavity surface-emitting laser." IEEE Photonics Technology Letters 12.1 (2000): 1-3.
Estrella et al., High-Speed Optical Interconnect for Cryogenically Cooled Focal Plane Arrays. Freedom Photonics LLC Santa Barbara United States, 2019. 4 pages.
International Search Report and Written Opinion in International Patent Application No. PCT/US2020/059479 dated Jul. 7, 2021, 7 pages.

* cited by examiner

FORWARD-BIASED MODULATOR FOR CRYOGENIC OPTICAL READOUT

CROSS-REFERENCE TO RELATED APPLICATION

The present application claims a priority benefit, under 35 U.S.C. § 119(e), to U.S. provisional application Ser. No. 62/957,493 filed on Jan. 6, 2020, titled "Forward-Biased Modulator for Cryogenic Optical Readout," which application is incorporated herein by reference in its entirety.

GOVERNMENT SUPPORT

This invention was made with Government support under Contract No. W911-NF-19-2-0114 awarded by the Army Research Office (ARO) and Contract No. RSA 1615555 awarded by the NASA Jet Propulsion Lab. The Government has certain rights in the invention.

BACKGROUND

While promising, optical readout of cryogenic devices is challenging. First, carrier freeze-out (the incomplete ionization of p-type and n-type dopants due to reduced thermal energy) can hinder the performance of semiconductor electro-optic devices operating at cryogenic temperatures. Second, while superconducting devices have low output impedances, typical input impedances for conventional electro-optic modulators can be high (e.g., >10 kΩ or more). This impedance mismatch makes direct delivery of electrical signals from a superconducting device to drive a modulator challenging, since it can prohibit high-frequency operation. Third, superconducting electronics typically operate with mV-range electrical signals, whereas driving signals for conventional room temperature electro-optic modulators are in the 0.5 V to 2 V range.

Previous demonstrations of optical readout have relied on cryogenic signal amplification and impedance-matching to directly modulate a laser diode. The scalability of this pre-amplified optical readout is hindered by the amplifier's milliwatt-scale power consumption, which is comparable to, or with multiple amplifiers would exceed, the thermal load imposed by conventional electrical readout techniques.

SUMMARY

Apparatus and methods for low-voltage, low-power, amplifier-less, optical read-out of devices in a cryogenic environment are described. A forward-biased optical modulator can be directly driven by a cryogenic device to encode a detection signal onto an optical carrier wave, for example. No power-consuming and heat generating amplifier is needed between the cryogenic device and the optical modulator in the cryogenic environment, thus reducing the thermal load on the cryostat and complexity of the circuitry. The resulting encoded signal can be multiplexed with other signals onto a single optical fiber and carried out of the cryogenic environment. The use of an optical fiber further reduces the thermal load on the cryostat, because the optical fiber has lower thermal conductivity than an electrically conductive cable. An optical fiber also permits greater signal bandwidth and higher data transmission speeds than lengthy electrical cables. Hence, scalability to a large number of optical read-out channels is possible for a cryogenic system. The optical read-out apparatus may be used for superconducting sensors, detectors, and quantum computing apparatus.

Some embodiments relate to optical modulators for operating in a cryogenic environment. Such optical modulators can include a plurality of semiconductor junctions formed along a waveguide, and biasing circuitry connected to the plurality of semiconductor junctions that is configured to receive a voltage or current that forward biases the plurality of semiconductor junctions during operation of the optical modulator.

Some embodiments relate to methods of operating optical modulators in a cryogenic environment. Such methods can include acts of cooling an optical modulator to a cryogenic temperature; while the optical modulator is cooled to the cryogenic temperature, forward biasing the optical modulator; and while the optical modulator is cooled to the cryogenic temperature and forward biased, modulating an optical carrier wave with the optical modulator.

Some embodiments relate to an apparatus for operating in a cryogenic environment. The apparatus can include: a device configured to produce an output signal during operation in the cryogenic environment; an optical modulator that is operably coupled to the device and configured to modulate an optical carrier in response to receiving the output signal during operation in the cryogenic environment; a plurality of semiconductor junctions formed along a waveguide of the optical modulator; and biasing circuitry configured to forward bias the plurality of semiconductor junctions during operation of the apparatus, wherein the optical modulator has a real input impedance of not more than 1000 ohms at 1 gigahertz.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

Figure 4A:
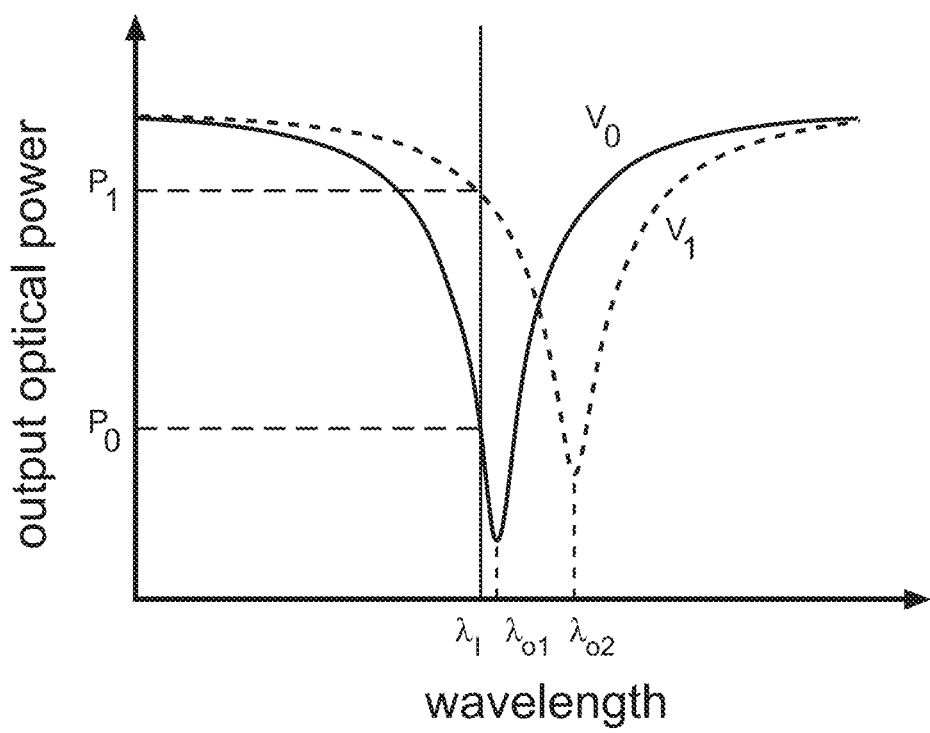
Figure 4B:
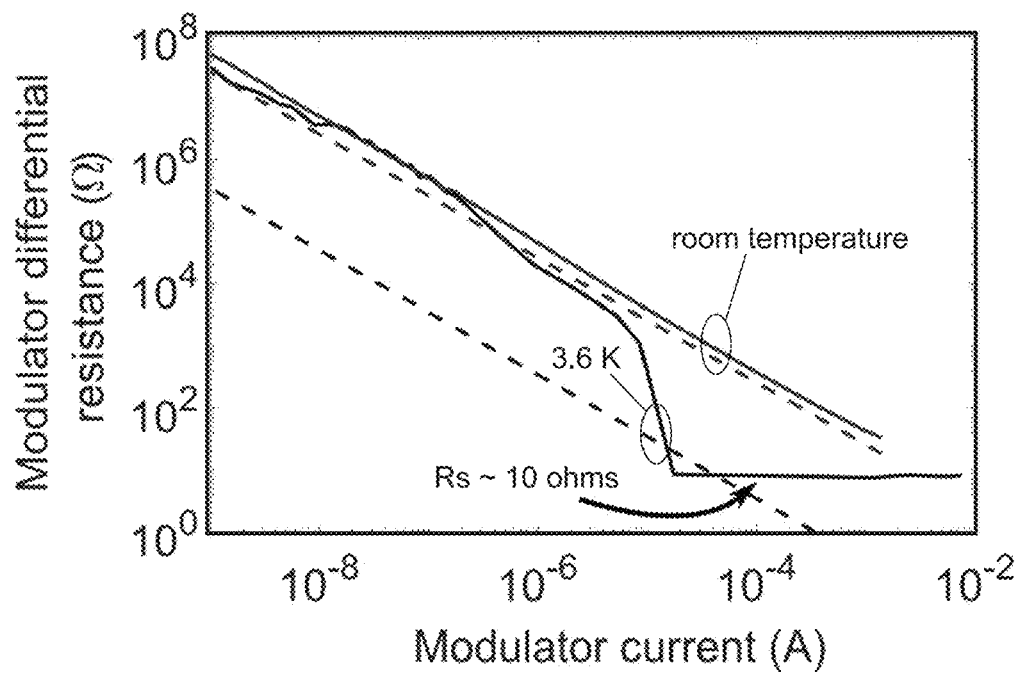
Figure 6A:
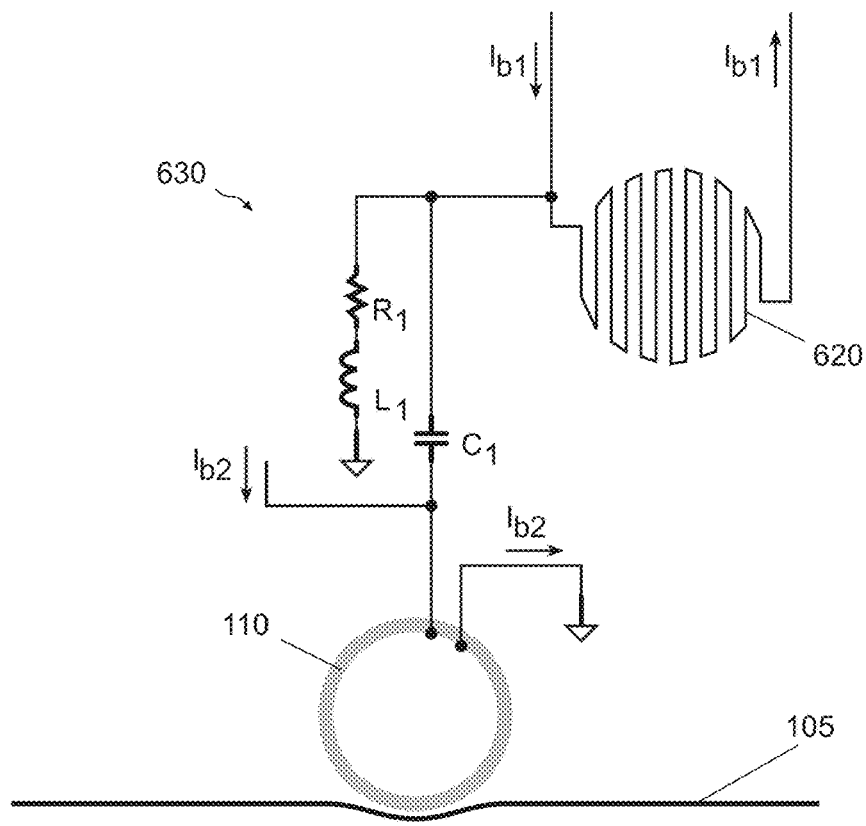
Figure 5A:
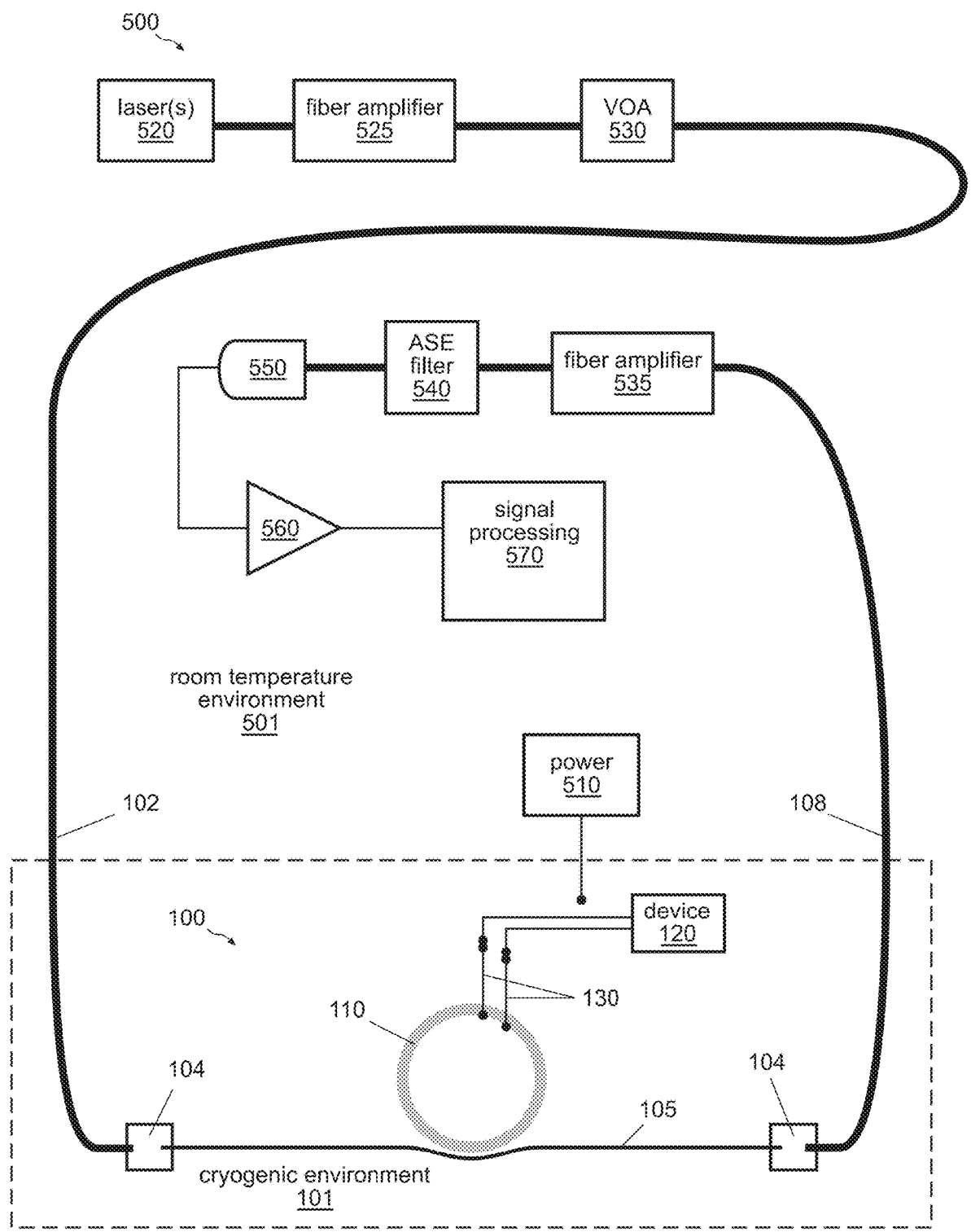
Figure 5B:
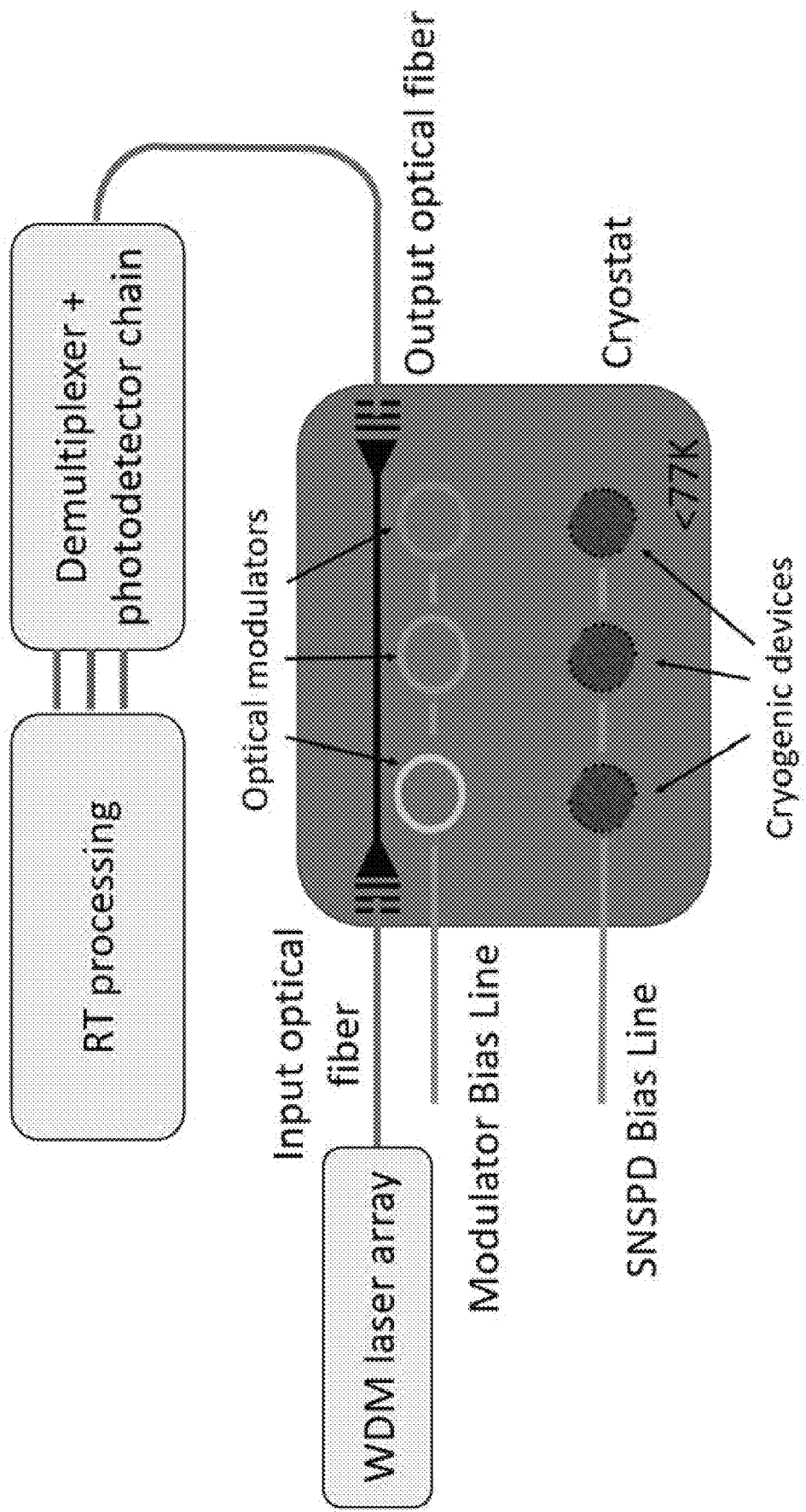
Figure 6B:
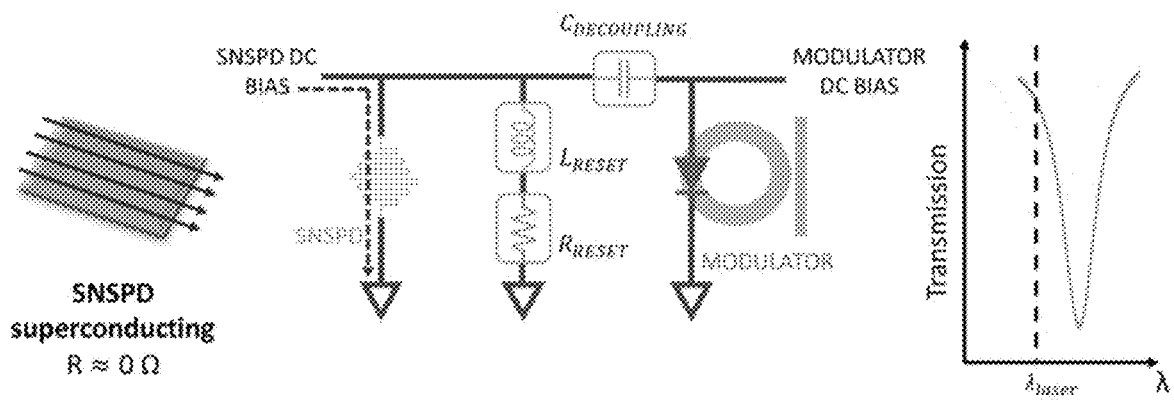
Figure 6C:
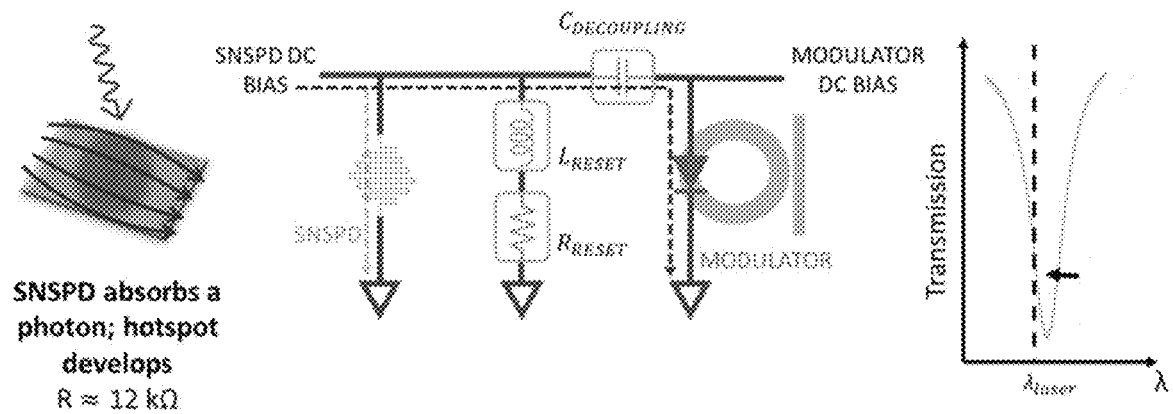
Figure 6D:
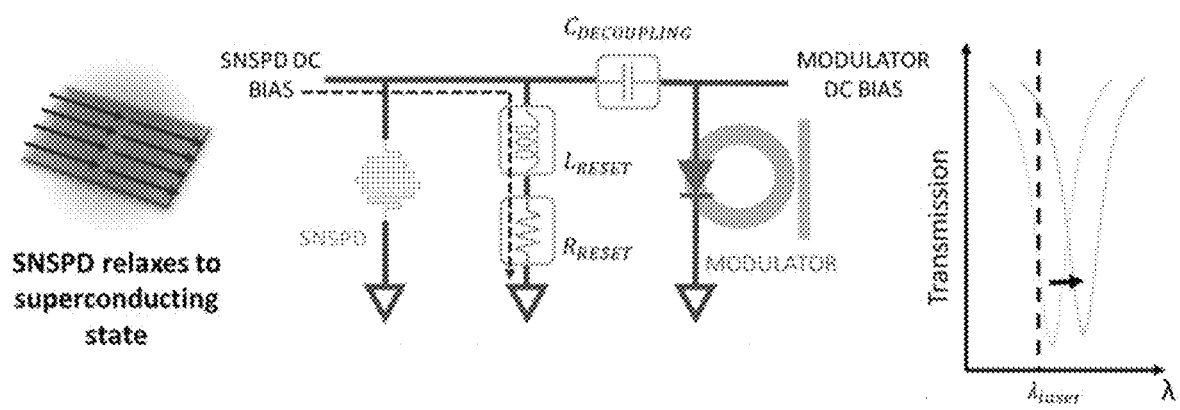
Figure 7A:
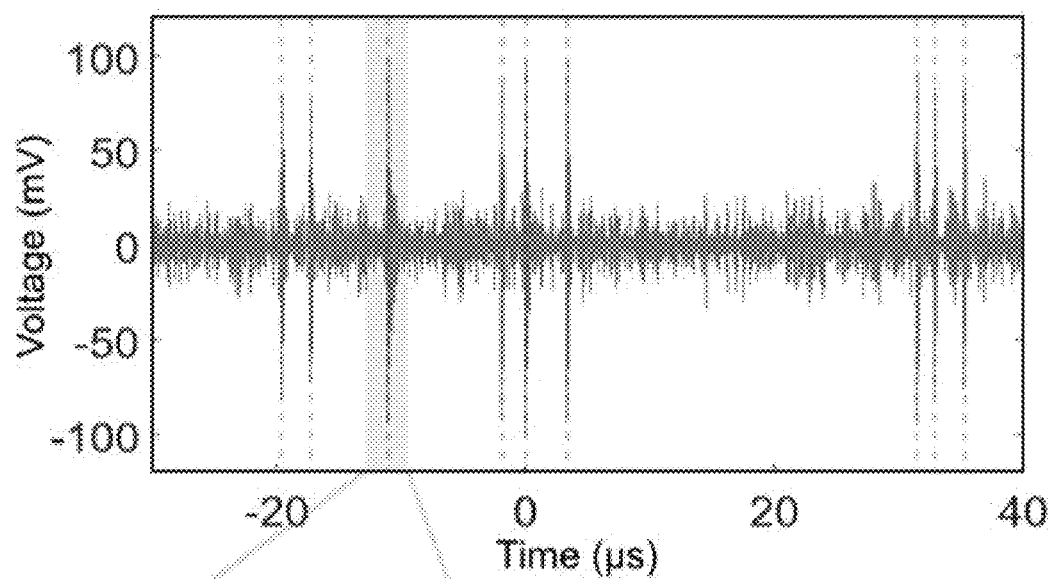
Figure 7B:
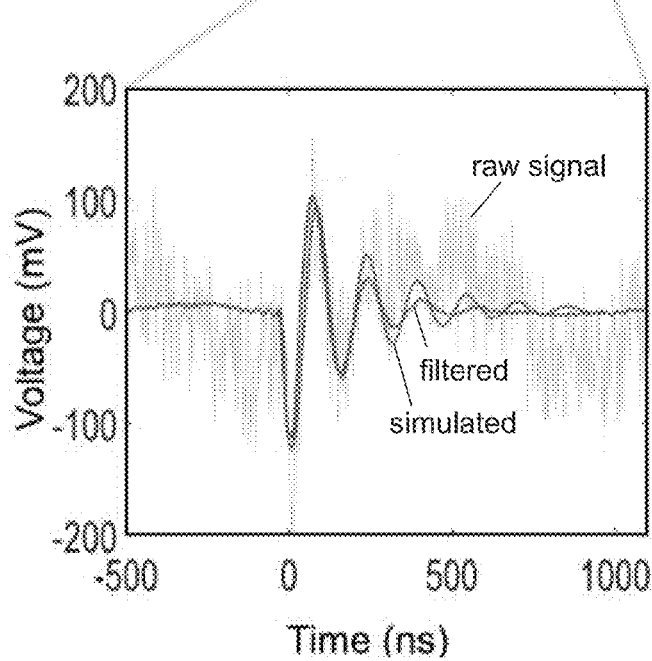
Figure 8A:
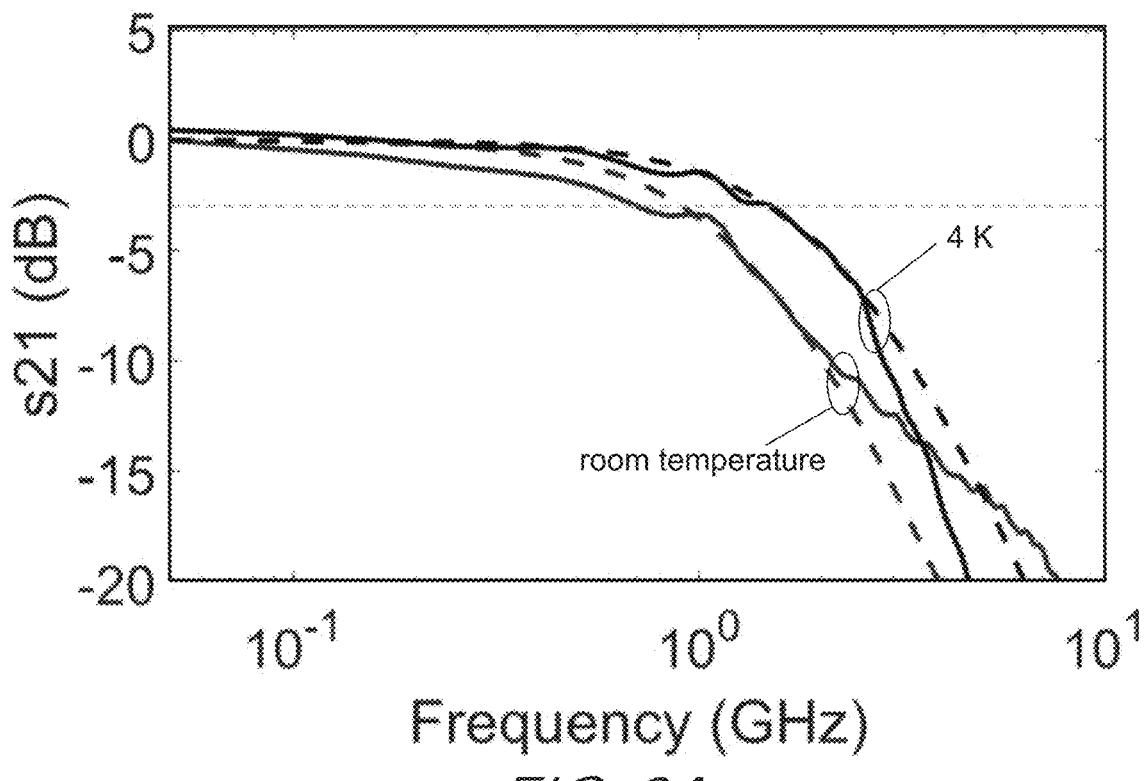
Figure 8B:
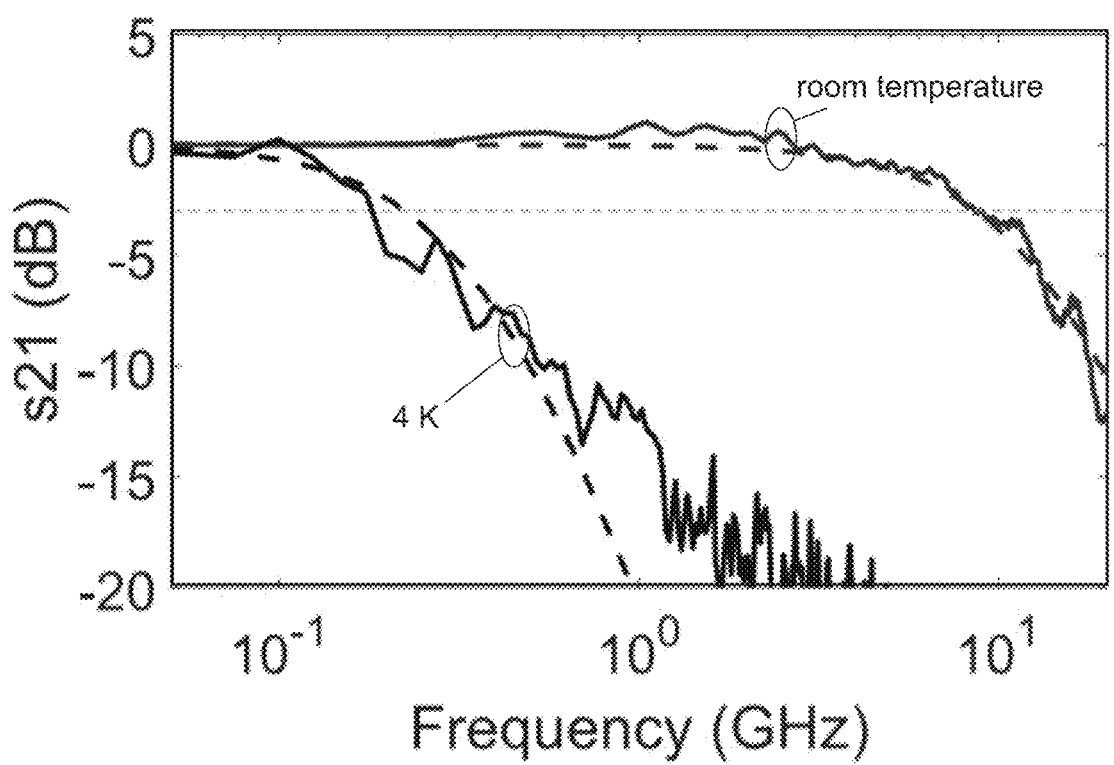
Figure 9:
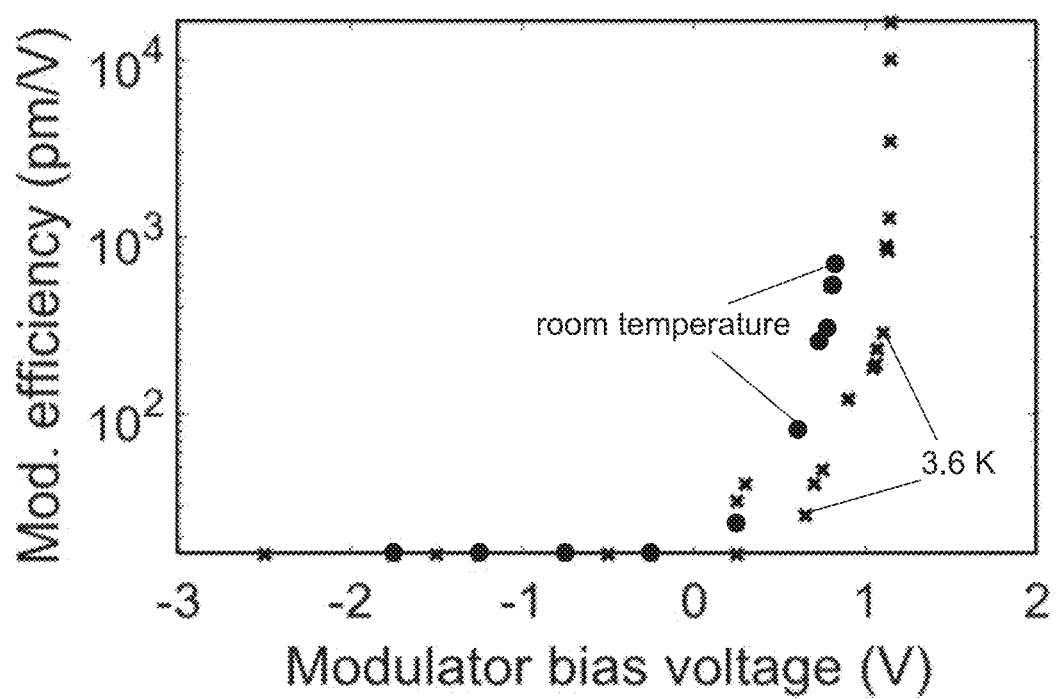
Figure 10:
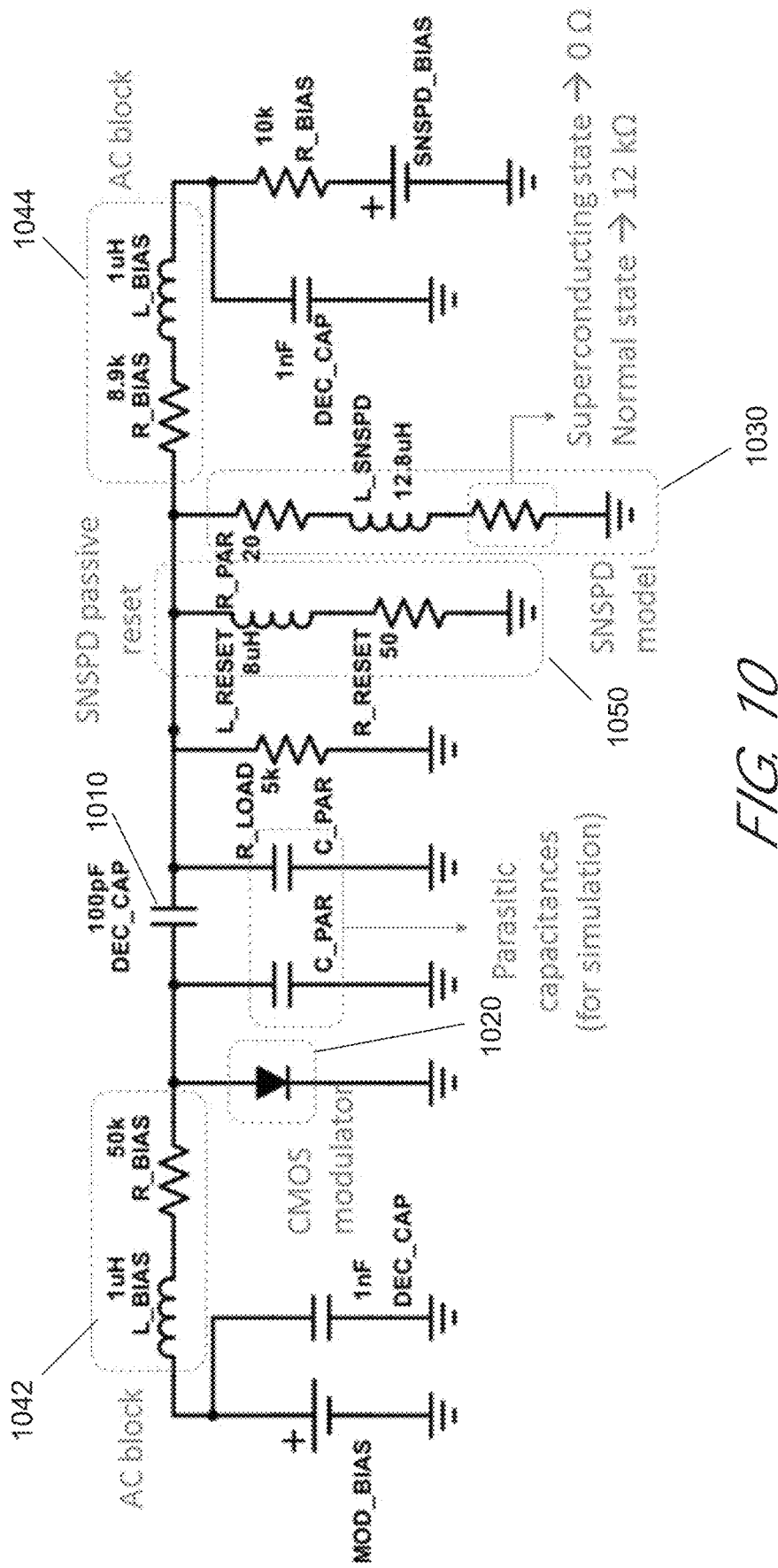
Figure 11A:
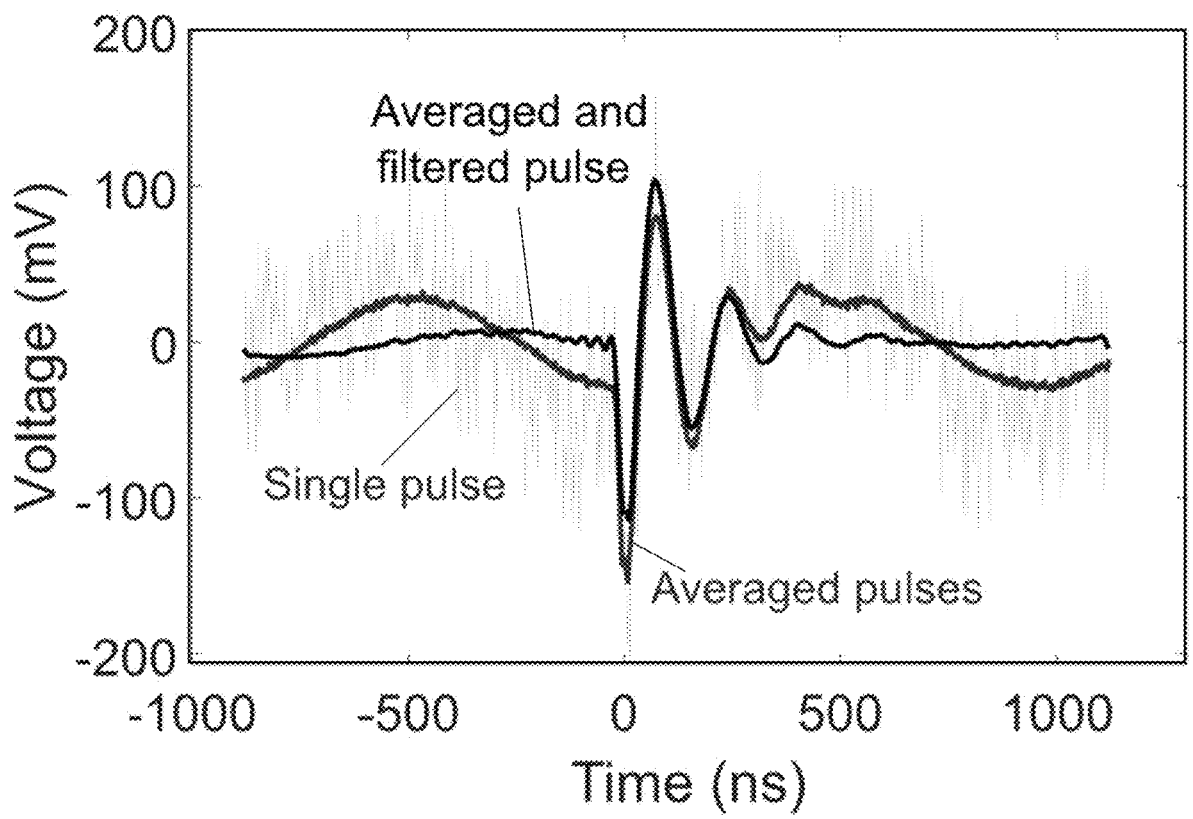
Figure 11B:
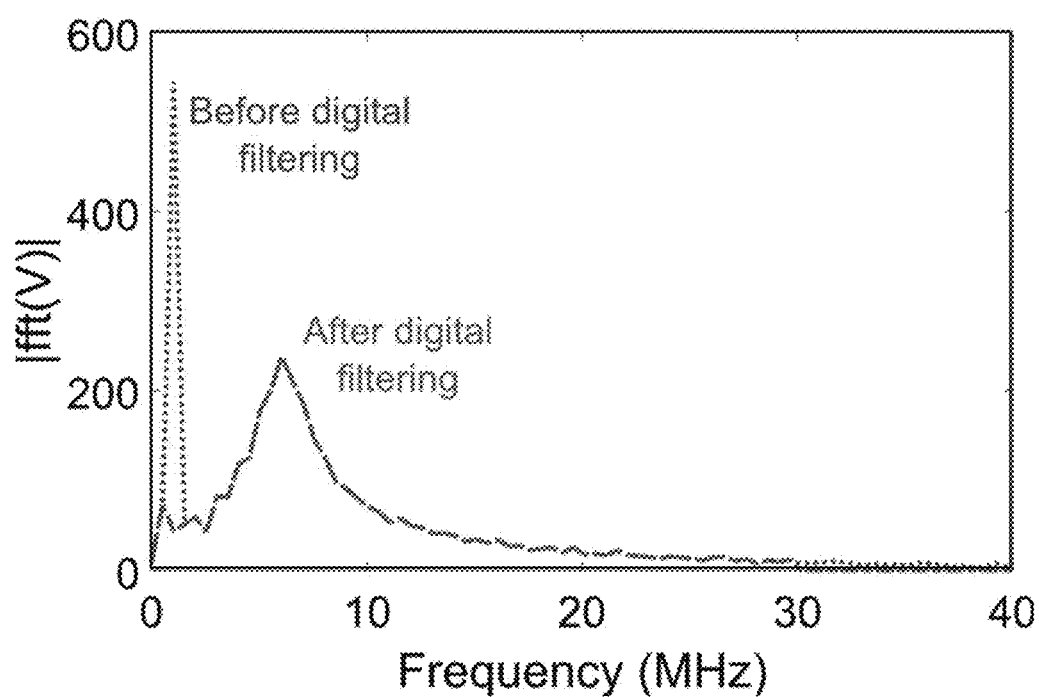
Figure 12:
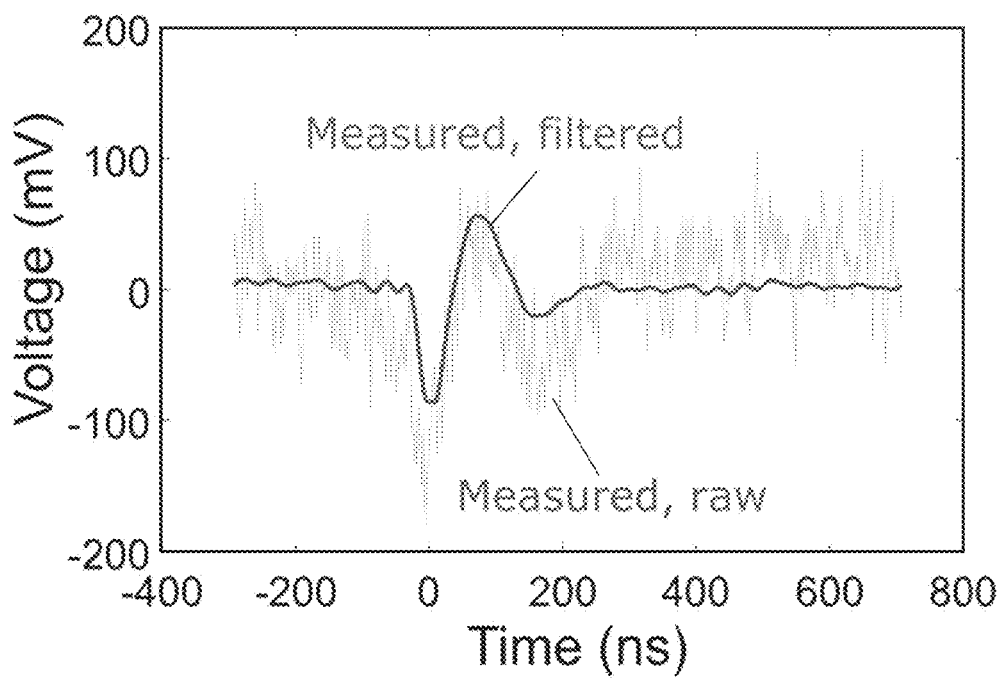
Figure 13A:
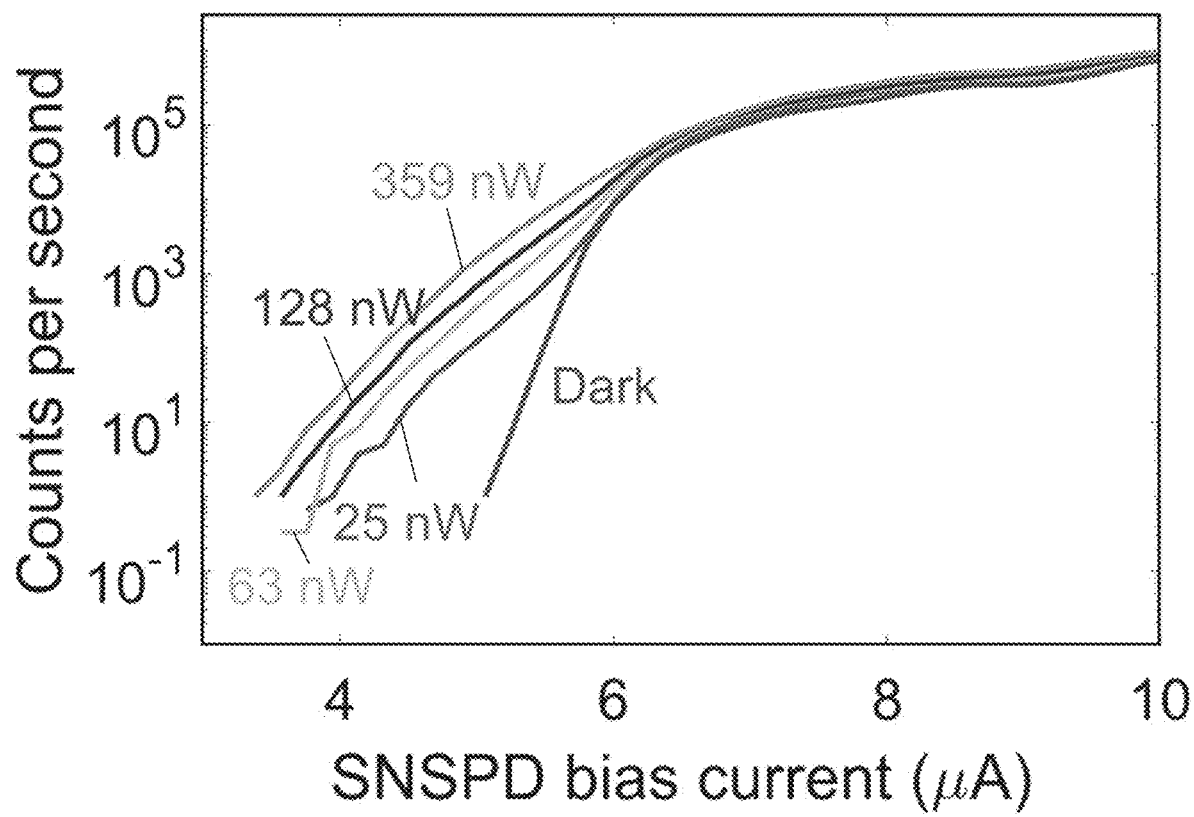
Figure 13B:
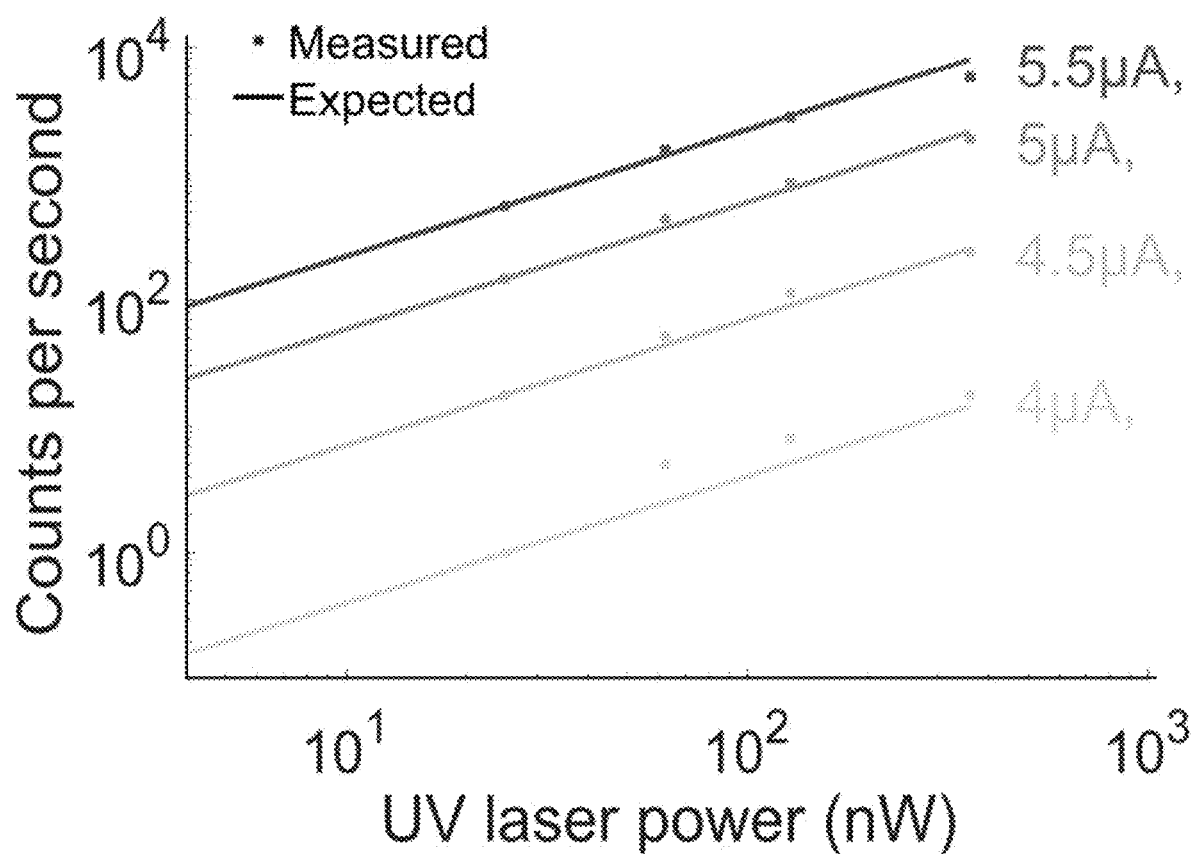

FIG. 4A plots an example of the shift in a transmission spectrum for an optical modulator;

FIG. 4B plots differential resistance of a modulator's p-n junctions as a function of forward bias current at two temperatures (approximately 300 K and approximately 3.6 K) for an example optical modulator;

FIG. 5A depicts an optical read-out system with a cryogenically cooled, forward-biased optical modulator driven directly by a cryogenically cooled device;

FIG. 5B depicts an optical read-out system with an array of cryogenically cooled, forward-biased optical modulators driven directly by cryogenically cooled superconducting nanowire single-photon detectors;

FIG. 6A illustrates an example system in which a SNSPD directly drives an optical modulator in a cryogenic environment;

FIG. 6B, FIG. 6C, and FIG. 6D illustrate operation of an SNSPD that directly drives a cryogenically cooled, forward-biased optical modulator;

FIG. 7A plots an example of a filtered signal having read-out pulses detected from the example system depicted in FIG. 6A;

FIG. 7B plots a raw, single read-out pulse, an averaged and filtered pulse, and a simulated electrical signal that drives the modulator for detection of a single photon;

FIG. 8A shows results from measurements of an example optical modulator's frequency-response bandwidth for a 20 µA forward bias at room temperature and at 4 K;

FIG. 8B shows results from measurements of the example optical modulator's frequency-response bandwidth for a 3-volt reverse bias at room temperature and at 4 K;

FIG. 9 plots measured modulation efficiency values for the example modulator as a function of applied bias voltage;

FIG. 10 shows a detailed circuit schematic of an optical read-out system having a forward-biased optical modulator;

FIG. 11A is a plot of a single optical readout pulse, an average of 500 optical readout pulses, and an averaged and digitally filtered readout in the time domain;

FIG. 11B is a plot of the magnitude of a fast Fourier transform (FFT) of averaged read-out signals before (left peak) and after (right peak) digital filtering;

FIG. 12 is a time-domain plot a single pulse detected from the optical read-out system and an averaged and filtered pulse for a modulator bias current of 25 µA and an SNSPD bias of 6 µA;

FIG. 13A plots counts per second from an example optical read-out system as a function of SNSPD bias current and UV power hitting the SNSPD and FIG. 13B plots counts per second from the example read-out system as a function of the UV optical power hitting the SNSPD for four different bias currents applied to the SNSPD.

DETAILED DESCRIPTION

Most systems operating at cryogenic temperatures communicate with systems operating at room temperature. Conventionally, this transfer of data relies on the use of electrical cables, which have certain disadvantages. Electrical cables present a high heat load to the cryostat due to thermal conduction of the metal wires and the need for amplification inside the cryostat, with milliwatt-scale power dissipation. Electrical cables add long latencies due to the long cable lengths needed to ensure correct thermal anchoring. Also, each electrical cable has a limited bandwidth density, and the cryostat has a limited size so that a large number of cables for handling many signal channels may not be possible.

The inventors have recognized and appreciated that an alternative approach to cryogenic electrical read-out and data transfer is optical readout and optical data transfer. For example, a signal generated by a cryogenic device in the cryostat is used to drive an electro-optical modulator, which encodes the signal onto an optical carrier that can be transported out of the cryostat through an optical fiber. The much lower thermal conductivity of the optical fiber reduces the heat load to the cryostat. Additionally, the bandwidth density for a single fiber can be orders of magnitude greater than that of a single electrical cable, because of the higher carrier frequency of optical signals and the ability to exploit wavelength division multiplexing in addition to other multiplexing schemes. With wavelength multiplexing, several optical carriers can be transported by the same optical fiber in and out of the cryostat and can be modulated by an array of electro-optical modulators, each tuned to one of the optical carrier wavelengths and connected to a different cryogenic device.

The inventors have further recognized and appreciated that cryogenic optical readout can be challenging for several reasons. One challenge recognized and appreciated by the inventors is that the optical modulator should work with the low-voltage signals (e.g., <5 mV) typical of cryogenic environments instead of the higher-voltage driving signals (e.g., >500 mV) for conventional modulators. Modulator operability with low-voltage signals can reduce or eliminate the need for power-consuming amplifiers that can place unwanted and/or excessive thermal loads on a cryostat.

In this regard, the inventors have recognized and appreciated that it is possible to implement an amplifier-less, cryogenic, optical read-out link using a forward-biased silicon-based optical modulator. Such an optical read-out link does not require an electrical or optical amplifier operating in the cryogenic environment. A forward-biased optical modulator can operate at room temperature at very high modulation efficiency but is usually dismissed for its high direct current (DC) power consumption. However, forward-biased, low-voltage, operation of a modulator at cryogenic temperatures (e.g., at or below 123 K) reduces this DC power consumption by at least an order of magnitude. Such reduction in electrical power consumption can make read-out with a forward-biased optical modulator feasible for low-voltage, low-power, cryogenic and high-temperature cryogenic (e.g., between 123 K and 223 K) applications.

As an example, operating a forward-biased silicon optical modulator at cryogenic temperatures is possible with <20 mV peak-to-peak electrical driving signal and <50 µA of DC bias current. Accordingly, such a forward-biased, cryogenically cooled, silicon-based optical modulator which also exhibits a low input impedance can be used to read out a cryogenically cooled superconducting nanowire single photon detector (SNSPD), camera, or sensor, according to some embodiments. In other applications, such as superconducting high-performance computing (e.g., employing Single Flux Quantum (SFQ) logic), an optical modulator could be used for readout of information from a Josephson Junction or other superconducting component. For applications in quantum computing, an optical modulator could be used for qubit readout (e.g., where qubits may be stored with superconducting Josephson junctions, trapped ions, etc.).

Figure 1A:
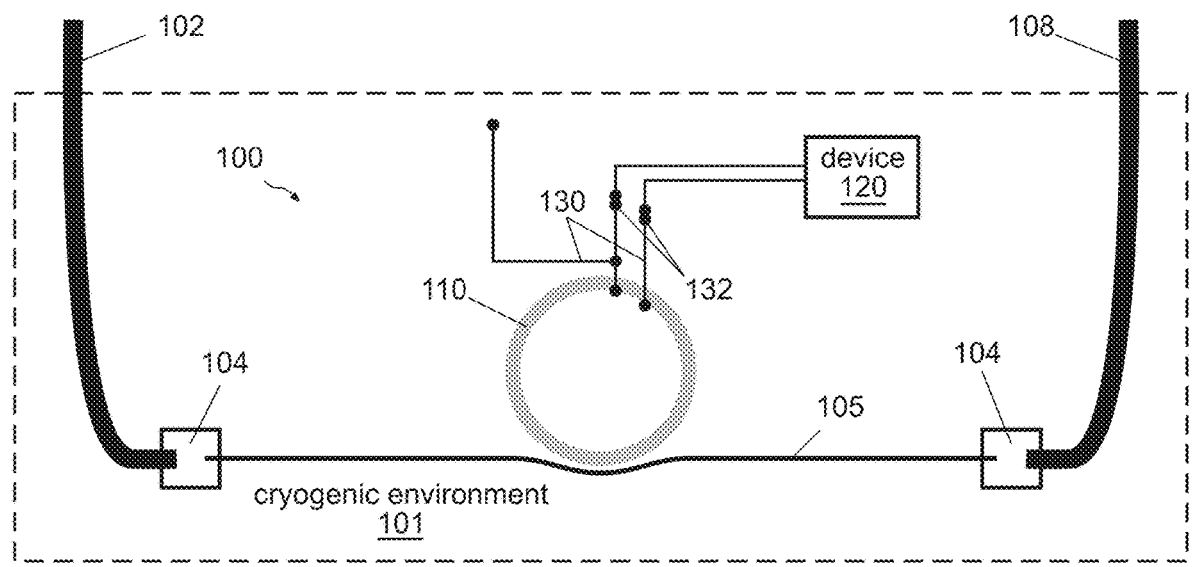
FIG. 1A depicts an example of an optical read-out circuit for a cryogenic environment.

FIG. 1A depicts an example of an optical read-out circuit 100 that includes a forward-biased optical modulator 110. This optical read-out circuit 100 includes a bus waveguide 105 located adjacent to an optical modulator 110, such that an optical mode in the bus waveguide 105 can excite, couple to, and interact with an optical mode in the optical modulator (e.g., by evanescent coupling). The optical read-out circuit 100 may further include optical couplers 104 at one or both ends of the bus waveguide 105. An optical coupler can couple light from an optical fiber 102 to the bus waveguide 105, for example. The optical modulator 110 and bus waveguide 105 may be formed on a same substrate, which may be contained in a package in some implementations. In some cases, the optical coupler(s) 104 may also be formed on the same substrate. The substrate and package may be suitable for placing in a cryogenic environment 101.

In operation, one or more optical carrier waves (e.g., radiation from one or more lasers) may be provided from an input optical fiber 102 to the bus waveguide 105. A carrier wave having an appropriate resonant wavelength can excite a resonant mode in the optical modulator 110 that can interact with the carrier wave in the bus waveguide 105. When there is no signal from the device 120, the bus waveguide 105 transmits a first optical signal to the output optical fiber 108 that indicates a first state of the optical read-out circuit. For example, the first optical signal may be a low-level optical signal or low level of transmission (e.g., less than 50%) of the optical signal provided to the input of the bus waveguide 105. When the device 120 outputs an electrical signal to the optical modulator 110, the resulting change in potential across semiconductor junctions in the modulator can generate carriers in the optical modulator that changes the refractive index of the modulator's waveguide where the resonant optical mode is located. This in turn changes the resonant wavelength of the modulator, which affects the signal output to the bus waveguide.

Accordingly, the bus waveguide 105 can transmit a second optical signal to the output optical fiber 108 that indicates a second state of the optical read-out circuit. In this example, the second optical signal may be a high-level optical signal or a high level of transmission (e.g., 50 or more) of the optical signal provided to the input of the bus waveguide 105. By detecting the two states from the output optical fiber 108 outside the cryogenic environment 101, one can determine the state of, or whether or not stimuli have acted upon, the device 120 inside the cryogenic environment.

In other cases, biasing or tuning can be used to reverse the first and second signal levels for two states of the optical read-out circuit. For example, a carrier wave may be tuned away from a resonant wavelength of the modulator (e.g., by biasing a laser diode source) such that a drive signal from a device 120 shifts the resonant wavelength of the modulator to the carrier wavelength rather than away from it. Alternatively or additionally, thermal heating of the modulator may be used to bias the resonant wavelength of the modulator to be at or away from the carrier wavelength when there is no signal from a device 120. Further, in some cases the device 120 may output more than two levels of signals, such that a plurality of discrete states or a continuum of states of the optical read-out circuit 100 may be possible.

The optical modulator 110 can include biasing circuitry 130 to at least receive a forward bias. The biasing circuitry can also include a modulation port 132 configured to receive signals from a device 120. The biasing circuitry can comprise conductive interconnects, according to some embodiments, that connect to p-type and n-type semiconductor regions of the optical modulator 110. The biasing circuitry can have two leads as shown or more leads to receive the signals from a device 120 and a forward biasing voltage or current from a DC biasing source. The biasing circuitry 130 can be formed on a same substrate as the optical modulator 110.

The device 120 can be a circuit component or assembly of components that operate in a cryogenic environment. Examples of such devices used alone or in assemblies comprising such devices include, but are not limited to, a superconducting nanowire single-photon detector (SNSPD), a superconducting quantum interference device (SQUID), a Josephson junction, a plurality of Josephson junctions configured as an amplifier, a traveling wave parametric amplifier (TWPA) which may be used to read out qubits, a semiconductor low noise amplifier (LNA) which may amplify a signal from a cryogenic device, a low-noise or cooled semiconductor photodetector, a low-noise or cooled semiconductor image sensor, and cooled receivers. In some cases, the device 120 may comprise an atomic clock or qubit storage device based on trapped-ions. In some embodiments, there is no amplifier located between the optical modulator and the device 120, such that the device 120 directly drives the optical modulator 110 in response to a stimulus that causes the device to output a signal to the optical modulator.

Figure 1B:
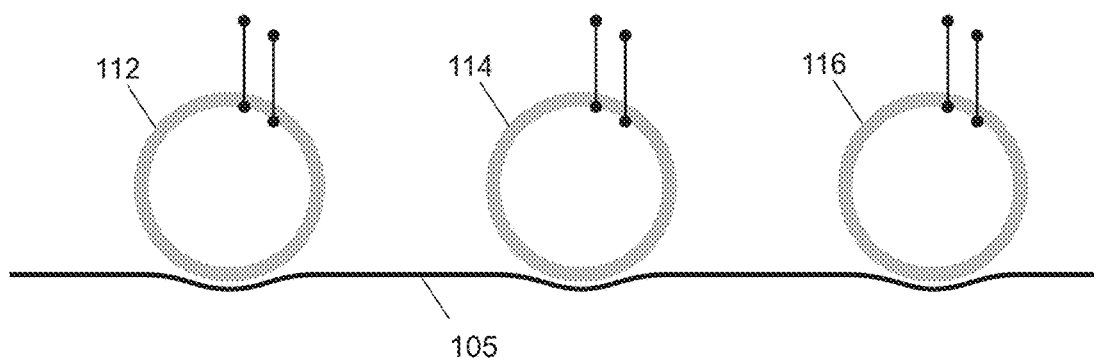
FIG. 1B depicts a portion of an optical read-out circuit that can multiplex multiple signals onto a single bus waveguide and optical fiber.

FIG. 1B shows a portion of an optical read-out circuit in which multiple optical modulators 112, 114, 116 are coupled to a bus waveguide 105. For this read-out circuit, a plurality of carrier waves having different wavelengths are coupled onto the bus waveguide. A first carrier wave can have a first wavelength that is a resonant wavelength for the first optical modulator 112. A second carrier wave can have a second wavelength that is a resonant wavelength for the second optical modulator 114, and so on for additional optical modulators. There may be up to tens of optical modulators or more coupled to a same bus waveguide. In this manner, wavelength division multiplexing (WDM) of multiple signals onto the same bus waveguide 105 and output optical fiber 108 is possible.

Figure 1C:
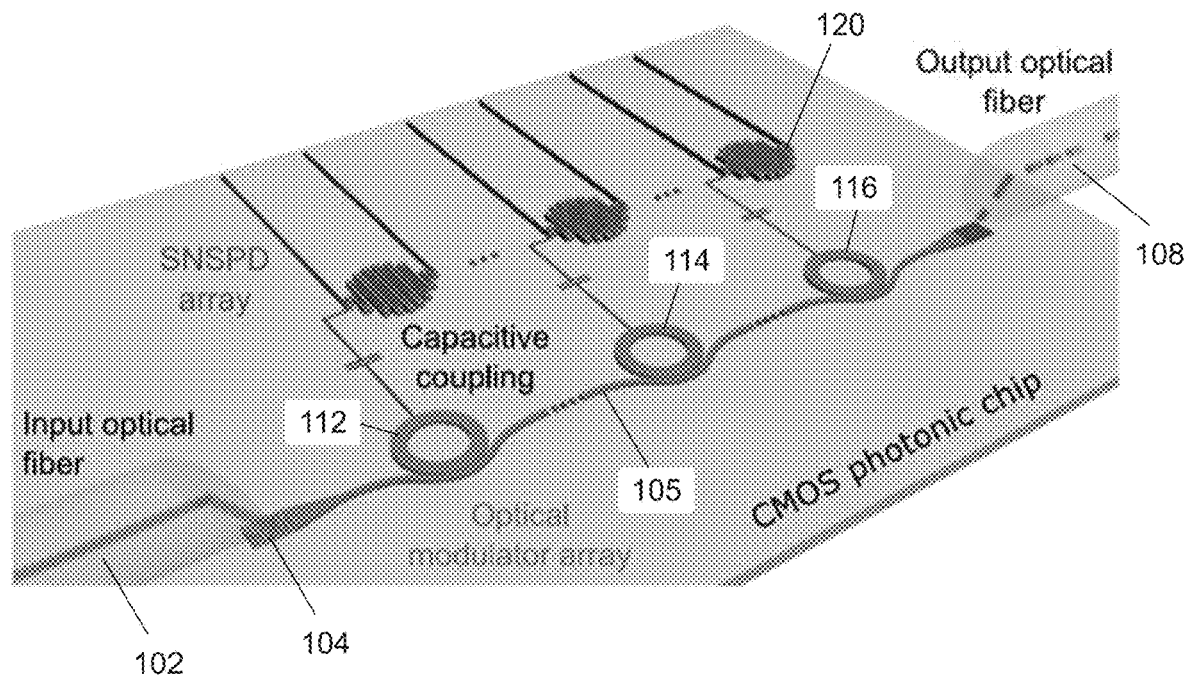
FIG. 1C depicts an example of an array of optical modulators coupled to an array of superconducting nanowire single-photon detectors.
Figure 1D:
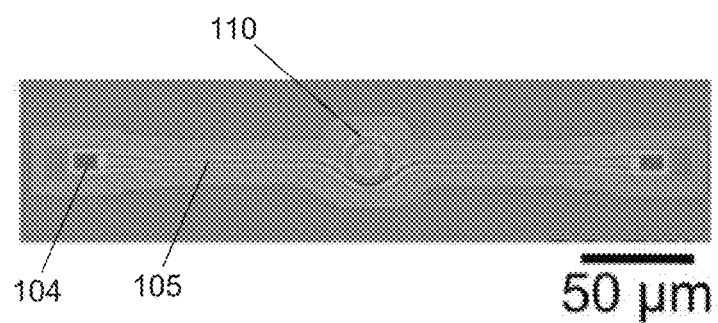
FIG. 1D depicts a micrograph of an optical modulator, optical couplers, and a bus waveguide along with further details of an example optical modulator.
Figure 1D:
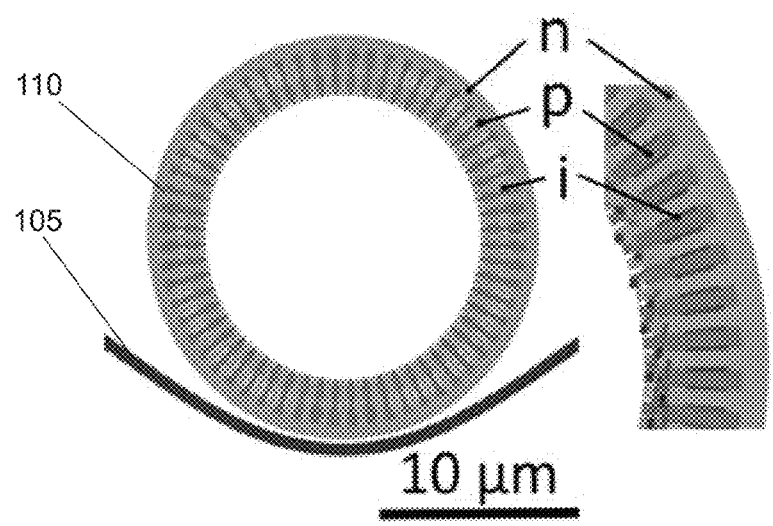

FIG. 1C illustrates an example of an array of optical modulators 112, 114, 116 formed on a same chip as an array of cryogenic devices, which in the illustrated example are superconducting nanowire single-photon detector (SNSPDs). The SNSPDs are arranged to directly drive the modulators (e.g., in response to a photon striking an SNSPD). By detecting which wavelength is modulated in response to a photon strike on an SNSPD, the location of the photon strike can be determined. Accordingly, the array of SNSPDs and modulators can form a single-photon imaging device. FIG. 1D illustrates further details of an optical modulator showing regions of p-type, n-type, and intrinsic semiconductor material. FIG. 1D also includes a micrograph of a microfabricated optical modulator 110, bus waveguide 105, and optical couplers 104 at ends of the bus waveguides.

In further detail, an optical modulator 110 for a cryogenic environment may be formed from one or more semiconductor materials (such as silicon, silicon-germanium, or a combination of silicon and silicon-germanium). The optical modulator may be formed as a microring modulator (e.g., having a waveguide formed in a circular shape as shown in FIG. 1A and FIG. 1B), though other shapes and designs are possible as described below in connection with FIG. 3A and FIG. 3C. An optical modulator 110 may be characterized by or specified for a resonant wavelength ($\lambda_o$=1550 nm), though other wavelengths are possible. When having a specified resonant wavelength, the optical path length (OPL) in the optical modulator 110 (when operating at a specified cryogenic temperature) for a carrier wave of the resonant wavelength will be an integral number of effective wavelengths in the material (e.g., $M\lambda_{0,eff}$) where M is a positive integer (typically greater than 50) and $\lambda_{0,eff}$ is the free-space resonant wavelength divided by the refractive index of the material containing the optical mode in the optical modulator 110. The optical path of the modulator's waveguide will be along a path where the peak intensity of an optical mode travels along the modulator's waveguide. Because the optical modulator 110 normally operates at cryogenic temperatures, a physical measurement of the optical modulator's OPL at room temperature may not necessarily reveal the modulator's specified resonant wavelength. For example, a measurement made at room temperature of the optical path in the modulator 110 (accounting for the material's refractive index) may result in a computed resonant wavelength that is offset from the modulator's specified resonant wavelength between 5 nanometers (nm) and 20 nm. That is, a specified resonant wavelength for a cryogenic optical modulator of the present embodiments can be between 5 nm and 20 nm less than a resonant wavelength calculated from room temperature measurements of the device (e.g., measured at 295 K).

As an alternative to measuring the OPL at room temperature and calculating a room temperature resonant wavelength, the modulator may be operated at room temperature and a carrier wave wavelength scanned, or a broad spectrum of wavelengths coupled into the bus waveguide 105 to directly observe the modulator's resonant wavelength. For a broad spectrum of wavelengths, the resonant wavelength may appear as a minimum value in the transmitted spectrum of wavelengths.

The bus waveguide 105 can be a single-mode waveguide with a core formed of the same material as, or a different material than, the optical modulator 110. The bus waveguide's core may be at least partially surrounded by a lower index cladding material, such as an oxide.

An optical coupler 104 may be formed as a grating coupler. A grating coupler can comprise a plurality of grating lines formed at an end of the bus waveguide 105 that deflect radiation from the bus waveguide out of the plane of the bus waveguide, or perform the reverse action of receiving out-of-plane radiation and directing it to the bus waveguide 105. When deflected out of the plane, the radiation can be coupled into an optical fiber. The grating coupler may include focusing properties, in some cases, to aid in efficient coupling to and from an optical fiber.

Alternatively or additionally, one or more focusing optical components may be used (e.g., GRIN lens, optical lens, binary optical lens, etc.). An optical fiber 102, 108 may be butt-coupled or edge-coupled to a substrate on which the bus waveguide is formed (e.g., butt-coupled to an end of the bus waveguide 105). In such cases, an end of the bus waveguide 105 may be gradually expanded as an optical coupler 104 to improve coupling efficiency between the fiber and bus waveguide.

For some applications, one or both of the optical couplers 104 may not be needed. Instead, all optics and/or signal detection circuitry may be included on a same chip as the optical modulator 110 and bus waveguide 105. In such applications, signal decoding circuitry may be included on the same chip and signals transmitted wirelessly out of the cryogenic environment.

Figure 2A:
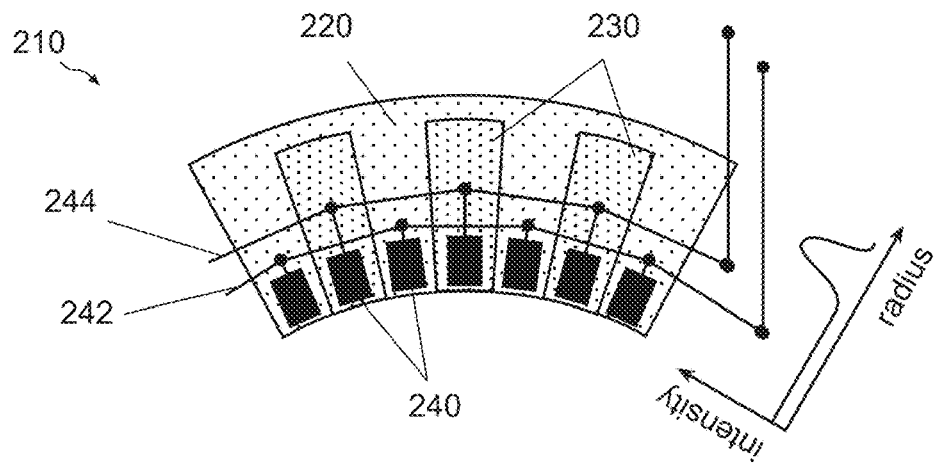
FIG. 2A depicts a portion of an optical modulator having T-shaped n-type regions that extend around p-type semiconductor regions.
Figure 2B:
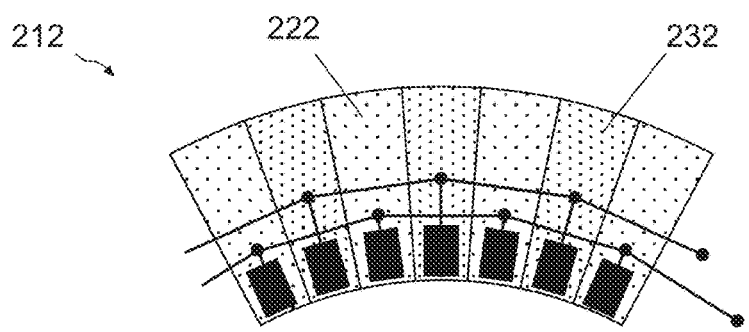
FIG. 2B depicts a portion of an optical modulator having alternating radial sections of n-type and p-type semiconductor regions.
Figure 2C:
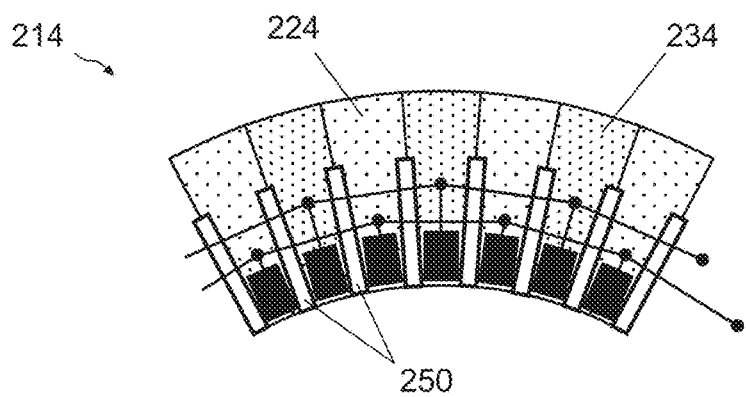
FIG. 2C depicts a portion of an optical modulator having alternating radial sections of n-type and p-type semiconductor regions and intervening intrinsic regions.

Further details of optical modulators are illustrated in FIG. 2A, FIG. 2B, and FIG. 2C. Arc-shaped portions of optical modulators 210, 212, 214 are shown in the illustrations. An optical modulator 110 may comprise a plurality of n-type semiconductor regions 220, 222, 224 and p-type semiconductor regions 230, 232, 234 through which an optical wave travels. The n-type and p-type regions may be distributed regularly or irregularly along a portion of the optical modulator 110 or all the way around the optical modulator. The n-type and p-type regions can form p-n junctions that, when biased, inject carriers into a region of the optical modulator through which the optical wave travels, thereby changing the refractive index in that region.

The optical modulator 210 can also include a plurality of conductive contact pads 240 that are in intimate contact with the n-type and p-type semiconductor regions. Contact pads on n-type regions 220 can be electrically connected with first conductive interconnects 242, and contact pads on p-type regions 230 can be electrically connected with second conductive interconnects 244. The conductive interconnects and pads may be located toward a center of the optical modulator and/or in regions of the optical modulator located away from regions carrying the optical wave, so as to reduce interference with and scattering and/or absorptive loss of the optical mode in the modulator, which losses may be due to metal conductive interconnects, for example. The interconnects 242, 244 can be formed as metal traces on one or more metallization levels, which can be located above the semiconductor material from which the n-type and p-type regions are formed. In some implementations, the interconnects 242, 244 can include conductive vias to make electrical connections between the interconnects and contact pads 240. One or both of the interconnects 242, 244 may be offset laterally from the contact pads 240 in some cases, or may be located directly over the contact pads 240 in other implementations.

For optical modulators 110 in which n-type and p-type semiconductor regions are located in arc-shaped regions, the modulator in that region may be formed to support a whispering gallery optical mode. For example, the modulator may have a width that is larger than a waveguide width that would normally support a single transverse optical mode. Because of the curve of the modulator, the optical mode can maintain a single-mode intensity profile where most of the intensity is located near an outer edge of the modulator, as depicted with the intensity plot in FIG. 2A. Such a large width of the modulator can be beneficial to reduce adverse influence of contact pads 240 and interconnects 242, 244 on the optical mode.

The configuration of n-type and p-type semiconductor regions in FIG. 2A shows T-shaped n-type regions. Such a design for an optical modulator 110 can improve injection of carriers near an outer edge of the modulator where the optical mode is located. However, carriers injected in the outer regions (e.g., regions beyond the p-type regions) can have a longer way to travel to clear the junctions of free carriers between signaling events. Such longer travel times can lead to lower operational frequencies of the optical modulator 110. The modulator's frequency-response performance can be improved by introducing intentional defects into the semiconductor regions. These defects act as traps and reduce carrier recombination time. Intentional defects may be created by ion bombardment, for example.

Another way to increase the speed of the modulator is modify the shape of the n-type and p-type semiconductor regions 222, 232 as depicted in FIG. 2B. For this design, radial "spokes" of n-type and p-type semiconductor regions each extend to the outer edge of the optical modulator's arc-shaped regions. In some implementations, the radial junctions extend from an inside edge of the modulator's waveguide or arc-shaped regions to at least 90% of the distance across the waveguide or arc-shaped regions. Such a structure may improve the modulator's frequency-response bandwidth by at least 50%, according to numerical simulations of the two designs in FIG. 2A and FIG. 2B. "Bandwidth" or "frequency-response bandwidth" for the described cryogenic optical modulators of the present embodiments is defined as the point at which a modulation amount (from a maximum time-averaged intensity to a minimum time-averaged intensity, averaged over 100 optical cycles) of an optical signal output from the optical modulator falls to 3 dB compared to the modulation amount at 1 Hz when the optical modulator is operated at its specified cryogenic temperature.

The modulator structures shown in FIG. 2A, FIG. 2B, and FIG. 2C will have frequency-response bandwidths that are dependent upon temperature, bias direction, and doping density. A forward-biased optical modulator having the structure shown in FIG. 2A may have a frequency-response bandwidth between 200 MHz and 2 GHz in some cases when operated at 4 K and having doping concentrations (e.g., between $1 \times 10^{15}$ cm$^{-3}$ and $4 \times 10^{18}$ cm$^{-3}$) in the n-type and p-type regions. Under the same reverse-biased operating conditions and doping, an optical modulator 110 having n-type and p-type semiconductor regions 222, 232 as depicted in FIG. 2B may have a frequency-response bandwidth between 1 GHz and 3 GHz in some cases, between 2 GHz and 4 GHz in some cases, and yet between 2 GHz and 5 GHz in some cases. The frequency-response bandwidth of a device can increase with higher doping concentrations and higher operating temperature.

Further improvements in the modulator's bandwidth and/or modulation efficiency are expected with the design shown in FIG. 2C. For this embodiment, intrinsic (undoped) regions 250 of silicon are retained between the n-type and p-type semiconductor regions 224, 234. The intrinsic regions 250 can extend radially and part way to an outer edge of the modulator 110. The intrinsic regions 250 may reduce the concentration of carries at inner regions of the modulator away from the optical mode where they have little or no benefit and contribute to unwanted capacitance and carrier-recombination delay. In some cases, the intrinsic regions 250 may redistribute electric field in the modulator and assist in increasing the concentration of carriers in an outer region where the optical mode is located. In forward bias and under the same operating conditions and doping stated above in connection with FIG. 2A and FIG. 2B, an optical modulator 110 having n-type and p-type semiconductor regions 224, 234 as depicted in FIG. 2C may have a frequency-response bandwidth between 500 MHz and 3 GHz in some cases. In terms of modulation efficiency, the modulator designs of FIG. 2A and FIG. 2C may have similar modulation efficiencies and the modulator design of FIG. 2B may have a lower modulation efficiency.

In some cases, an optical modulator may be used in a reverse-bias mode. When used in reverse bias at the same temperature and doping concentrations indicated above, the modulator designs of FIG. 2A and FIG. 2B. may have a similar bandwidth (e.g., between 250 MHz and 3 GHz), though the design of FIG. 2A may have a higher modulation efficiency. The design of FIG. 2C may have the highest bandwidth (e.g., between 500 MHz and 5 GHz) and a similar modulation efficiency as the design of FIG. 2A.

Intentional defects can also be introduced into the structures of FIG. 2B and FIG. 2C to further improve carrier recombination speed and the modulator's frequency-response bandwidth. The introduction of defects may provide some of the higher bandwidths listed above, or even larger frequency-response bandwidths.

Figure 3A:
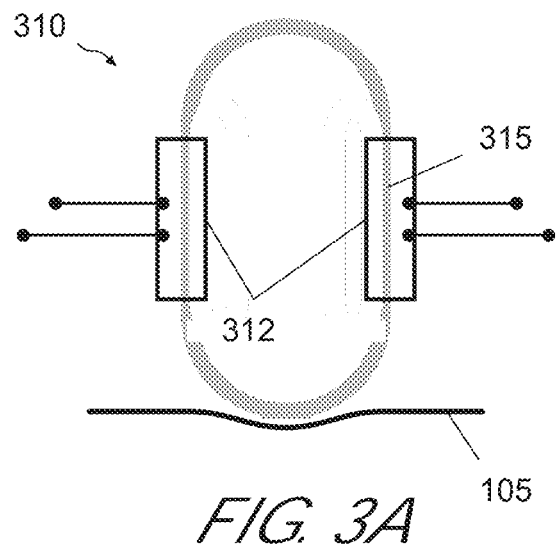
FIG. 3A depicts an optical modulator having an oval or racetrack configuration.

An alternative configuration for an optical modulator 310 is depicted in FIG. 3A. The optical modulator 310 may be formed in an oval or racetrack shape have straight portions of the modulator's waveguide. Modulation regions 312 may be limited to the straight portions, as shown. Alternatively or additionally, modulation regions may extend around the entire oval. If the arc-shaped portions of the modulator's waveguide are formed to support whispering gallery modes (e.g., for additional modulation regions), then the width of the arc-shaped portions may be wider than the modulation region waveguide 315 along the straight portions of the oval, which may be formed as single-mode optical waveguides that support only a single transverse optical mode.

Figure 3B:
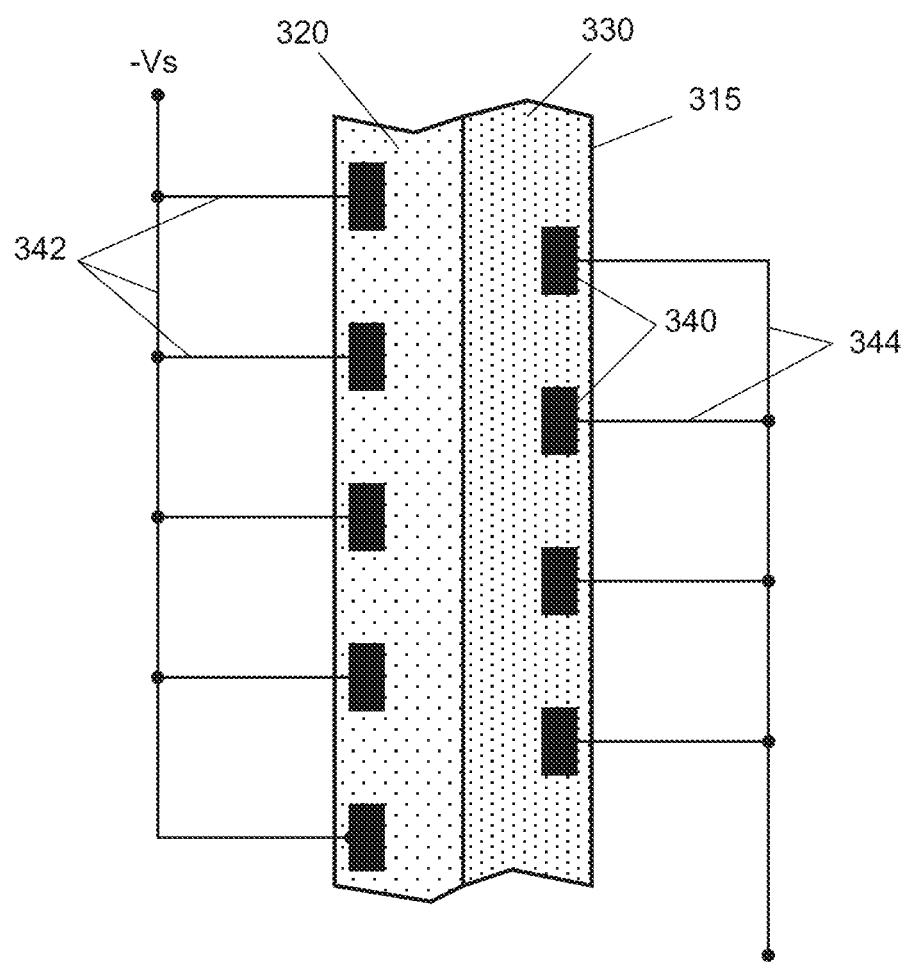
FIG. 3B depicts a portion of an optical modulator having n-type and p-type semiconductor regions.

An advantage of an oval-shaped optical modulator 310 is that lengthy modulation regions 320 can be employed to increase the modulation efficiency of the modulator. For the straight modulation regions 312, the n-type semiconductor regions 320 and p-type semiconductor regions 330 can extend along adjacent portions of the modulation region waveguide 315, as illustrated in FIG. 3B. There may be only one n-type semiconductor region 320 and one p-type semiconductor region 330 that extends the entire length of the modulation region waveguide 315.

Of course, there may be more than one such semiconductor region per modulation region waveguide 315. In some cases, when multiple semiconductor regions are used along a modulation region waveguide 315, the semiconductor regions may alternate sides of the waveguide along its length. The semiconductor regions 320, 330 may be arranged laterally across the waveguide 315. In other implementations, the semiconductor regions may be arranged vertically (e.g., above and below each other in the waveguide, into the plane of the drawing). There can be a plurality of contact pads 340 distributed along the semiconductor regions 320, 330, and interconnects 342, 344 providing electrical connection to the contact pads. The p-n junctions 320, 330 of the racetrack modulator 310 can be forward biased when operated in a cryogenic environment.

Figure 3C:
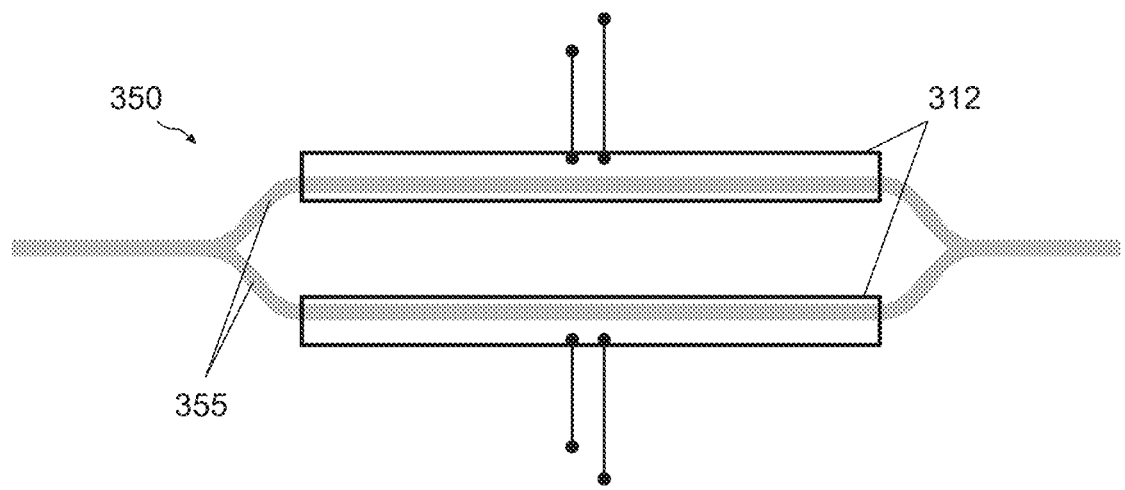
FIG. 3C depicts a Mach-Zehnder optical modulator suitable for forward-biased operation at cryogenic temperature.

Another configuration for a cryogenic optical modulator is a Mach-Zehnder optical modulator 350 depicted in FIG. 3C. Such a modulator may comprise two interferometer arms 355 formed as single mode optical waveguides. There can be a modulation region 312 on the straight portion of one of the interferometer arms, or on straight portions of both interferometer arms. The modulations regions 312 may be formed as described in connection with FIG. 3B. Like the above-described optical modulators 110, 310, the p-n junctions of the Mach-Zehnder optical modulator 350 can be forward biased when operated in a cryogenic environment.

The above-described optical modulators may have a radius of curvature (in arc-shaped regions) between 5 µm and 20 µm according to some embodiments. The modulator's waveguide (whether to support whispering gallery modes or designed as single transverse mode waveguides) may have a width between 250 nm and 2.5 microns and a thickness between 50 nm and 500 nm. According to some embodiments, the waveguides may be formed of silicon, silicon-germanium, or a combination thereof. For example, an outer portion of a microring optical modulator 110 may be formed from silicon-germanium through which the optical mode travels, and an inner portion of the modulator may be formed from silicon, or vice versa. An advantage of using silicon-germanium is that it can increase the recombination speed of free carriers in the modulator's waveguide compared to a waveguide having no silicon-germanium. Additionally, silicon-germanium can increase the sensitivity of refractive index in the waveguide to changes in carrier concentration in the waveguide compared to the waveguide having no silicon germanium. The optical modulators of the present embodiments may be fabricated using standard complementary metal-oxide-semiconductor (CMOS) fabrication processes, according to some implementations.

An integrated heater (such as a resistive element) can be fabricated on a chip in close proximity to an optical modulator 110, 310, 350. The heater can be thermally coupled to a waveguide or waveguides of the optical modulator and arranged to provide heat uniformly to the waveguide(s). An external bias applied to the heater can be used to adjust a resonant wavelength of the modulator in some implementations. The heater may be part of a wavelength locker, which can include a feedback loop to lock a resonant wavelength of the modulator to a wavelength of a carrier wave that is modulated by the modulator. Alternatively or additionally, a wavelength locker may be used for the carrier wave source (e.g., a laser) that adjusts the carrier wave wavelength to be at a resonant wavelength of the optical modulator. Such wavelength locker may employ feedback loops that adjusts the wavelength of the carrier wave source and/or temperature of the modulator based on an output from the output optical fiber 108 (such as an amount of transmitted carrier wave when the modulator is in an off state).

An amount of forward biasing used for the above-described optical modulators may be from 0.1 microamp ($\mu A$) to 50 $\mu A$ or approximately those values, according to some embodiments. The static electrical power dissipation of a modulator may be between 0.05 $\mu W$ and 50 $\mu W$. In some cases, the modulators may be driven with time-varying signals having peak-to-peak amplitudes from 0.05 mV to 20 mV or any sub-range within this range of values. In some implementations, the driving signal may be no greater than 10 mV. An advantage of forward biasing the modulators is that it can prevent carrier freeze out at cryogenic temperatures. As a result, the optical modulators may operate at temperatures down to 1 K or lower (e.g., as low as 200 mK). For example, the forward bias may provide sufficient local heating to allow operation of the modulator at suitable modulation efficiencies.

An advantage of forward biasing is that it can allow high modulation efficiency at low voltages. Modulation of an optical carrier wave can be understood with reference to the plots of FIG. 4A. A cryogenic modulator 110, 310, 350 of the present embodiments can exhibit a sharp, notch-filter optical transmission spectrum (solid line) with a stop-band at the resonant wavelength of the modulator $\lambda_{o1}$. An optical carrier wave having a wavelength $\lambda_1$, which may be at the resonant wavelength or offset from the resonant wavelength but in the stop-band, may pass through the bus waveguide 105 or through the Mach-Zehnder interferometer with a first power level $P_o$. In some cases, the first power level may be very low and not detected at the output fiber 108 or output of a Mach-Zehnder interferometer. Changing a voltage across the p-n junctions (e.g., from $V_0$ to $V_1$) modulates the free carrier concentration (electrons and holes) in the waveguide(s), which influences the refractive index of the waveguide(s) due to the plasma dispersion effect and shifts the resonant wavelength to a new value $\lambda_{o2}$ and accordingly changes the transmission spectrum, as illustrated in FIG. 4A. The change in the transmission spectrum allows an increased amount of power $P_1$ to pass, thereby modulating the optical carrier wave.

Forward biasing the optical modulator allows modulation with millivolt changes in the applied voltage. The change in applied voltage may be referred to as a differential voltage $\Delta V$, and may be induced by a signal received from a cryogenic device 120. The static forward bias voltage ($V>V_{ON}$) opposes the built-in electric field of the modulator's semiconductor junctions. In this regime, the change in carrier density is due to carrier injection, which depends exponentially on voltage applied to the p-n junctions. This is in contrast with reverse bias operation ($V<0$), where the carrier density change comes from modifying the depletion region width of the p-n junctions. Reverse bias operation exhibits a much weaker carrier density dependence on voltage ($\sqrt{V}$) and an increased sensitivity to doping density (and hence carrier freeze-out). In reverse bias the modulation efficiency—the change in resonant wavelength with applied voltage—ranges from 16 pm/V (which was measured by the inventors for an example device) to 250 pm/V for the highest performing device reported to date in the literature. In forward bias and at 3.6 K, the inventors have measured modulation efficiencies for the same example device reaching 1000 pm/V at 7 $\mu A$ forward bias and 10,000 pm/V at 40 $\mu A$. Implementations of cryogenic read-out with forward-biased optical modulators described herein may employ a modulator having a modulation efficiency between 100 pm/V and 15,000 pm/V.

Cryogenic operation fundamentally changes the performance trade-off between forward and reverse bias. At cryogenic temperatures, the carriers are distributed over a narrower range of energy states within the conduction and valence bands compared to their distributions at room temperature. Thus, more carriers are injected into the semiconductor at cryogenic temperatures for the same differential voltage $\Delta V$ used at room temperature. This implies that the slope of junction current vs. applied forward-bias voltage is steeper than the slope at room temperature, which is supported by measurements of the example modulator. Therefore, at cryogenic temperatures the same differential carrier injection (and thus the same modulation efficiency) can be achieved at a lower forward-bias current (and thus at lower static electrical power consumption). The inventors found for an example device that the DC electrical power to achieve a modulation efficiency of 700 pm/V at room temperature is about 23 $\mu W$, whereas essentially the same modulation efficiency could be obtained with 1.1 $\mu W$ electrical power at 3.6 K.

Although forward biasing can provide significantly higher modulation efficiencies than reverse biasing, forward biasing is typically not used because of increased power consumption (due to static current flowing through the p-n junctions) and lower modulation speed. The injected charges are not removed by a strong electric field (which can be generated in reverse bias), but recombine to reset the device state, which happens on the scale of the carrier recombination lifetime (~ns).

Another advantage of forward biasing relates to reducing the input impedance of the optical modulator. Because of the rectifying property of p-n junctions, an optical modulator under reverse bias presents a purely capacitive input impedance, but forward bias adds a resistive component that can significantly lower the input impedance of the optical modulator. The lowered input impedance can reduce an impedance mismatch between a cryogenic device 120 and the optical modulator 110, 310, 350 and allow the optical modulators to be directly driven by cryogenic devices 120. A high impedance mismatch between a device 120 and an optical modulator 110 can result in much of the power from the device being reflected back to the device or diverted to another circuit path, such as a reset branch, resulting in insufficient drive current for the optical modulator.

The resistive component of a forward-biased p-n junction can be expressed as a differential resistance $r_d = R_s + kT/qI$, where $R_s$ is series resistance, k is the Boltzmann constant, and I is the current through the p-n junctions of the modulator. For forward-biased optical modulators of the present embodiments, the modulator's resistance is limited by $R_s$, which is mainly due to the resistance of the quasi-neutral regions of the p-n junctions in the modulator. The series resistance $R_s$ also includes resistance of interconnects (typically formed in metallization levels), conductive vias, etc. on the modulator chip, which can be between 5Ω and 20Ω for a modulator in some embodiments. At conventional doping levels, the resistance due to the quasi-neutral regions in the semiconductor can be much greater than the resistance of interconnects and dominate $R_s$.

FIG. 4B shows calculated and measured differential resistance as a function of forward-bias current for a cryogenic optical microring modulator having a junction structure like that depicted in FIG. 2A and including intervening intrinsic regions 250 shown in FIG. 2C. A diameter of the microring was approximately 20 μm with a whispering gallery waveguide approximately 1.7 μm wide and roughly 100 nm thick. The dashed lines represent theoretical calculations with $R_s = 0$. The solid lines are measured values at room temperature (about 300 K) and 3.6 K. The differential resistance drops from about 2 kΩ at 300 K to about 10Ω at 3.6 K (due to the temperature dependence of $r_d$) with about 20 μA of forward bias current. The differential resistance $r_d$ becomes limited above 10 μA by the series $R_s$ to about 10Ω. A superconducting device, such as an SNSPD, can directly drive a modulator having an input impedance of 10Ω.

The theoretical values and the measured values differ at 4K because the theoretical curve assumes an ideal diode where the only carrier transport mechanism is diffusion through the barrier. While at room temperature this assumption is a reasonable approximation, at 4K the assumption is no longer accurate. Different transport mechanisms dominate at different bias points. Because of the different transport mechanisms, the theoretical values diverge from measured values.

Although $R_s$ is sensitive to carrier freeze-out, the small current flowing through the forward-biased junctions of the modulator can ionize the dopant atoms, maintaining a low $R_s$. The real input impedance of an optical modulator can be reduced further. For example, an increase in dopant density in the semiconductor regions can reduce the series resistance of those regions. The dopant density in the p-type and/or n-type semiconductor regions may be increased to a value between $5 \times 10^{16}$ cm$^{-3}$ and $5 \times 10^{17}$ cm$^{-3}$. In some cases, the dopant density in the p-type and/or n-type semiconductor regions may be increased to a value between $5 \times 10^{17}$ cm$^{-3}$ and $8 \times 10^{18}$ cm$^{-3}$. Alternatively or additionally, metallization of p-type and n-type semiconductor regions for contact pads can be employed and extended farther out toward an edge of the modulator's waveguide to provide a lower resistive path than the semiconductor in the modulator's circuitry. Further, a thickness of the intrinsic regions 250 can be reduced to lower resistance. For example, the intrinsic regions may have a width no greater than 500 nm in some cases, no greater than 1 micron (μm) in some implementations, and yet no greater than 2 μm in some cases. By increasing dopant concentration, employing metallization, and limiting the thickness of intrinsic regions (if used) a series resistance of an optical modulator may be reduced to a value between 10Ω and 500Ω for forward-bias currents between 5 μA and 20 μA in some cases. In some implementations, such modifications may reduce the real impedance of an optical modulator to a value between 25Ω and 250Ω for forward-bias currents between 5 μA and 20 μA. Having a real input impedance of 50Ω or less and operating at temperatures of 1 K or less can allow the cryogenic optical modulators to read out devices of SFQ circuits and/or qubits for some quantum computing applications.

FIG. 5A illustrates an example of an optical read-out system 500 for cryogenic devices, according to some embodiments. The system may include an optical read-out circuit 100 as described in connection with FIG. 1A or may include a WDM read-out circuit as described in connection with FIG. 1B. Any suitable optical modulator or modulators 110, 310, 350 may be used. A power source 510 may be located in a room temperature environment 501 to provide electrical power to devices in a cryogenic environment 101, such as current and/or voltage to operate cryogenic devices 120 and forward bias the optical modulator 110. Additional optical and electrical components can be located in the room temperature environment 501 to provide at least one optical carrier wave to the optical read-out circuit 100, receive optical signals from the optical read-out circuit 100, convert the received optical signals to electrical signals, and process the electrical signals.

One or more optical carrier waves can be generated in a room temperature environment 501 with one or more lasers 520. The carrier wave(s) can be coupled from the laser(s) into an input optical fiber 102. If higher power is desired than that output by each laser, a fiber amplifier 525 can be included to amplify the carrier wave(s) in the input fiber 102. An example of a fiber amplifier that may be used is an erbium-doped fiber amplifier (EDFA), which may be optically pumped by diode lasers, for example. According to some implementations, a variable optical attenuator (VOA) 530 may be included along the input optical fiber 102 to adjust the intensity of one or more carrier waves.

Output optical signals from the output optical fiber 108 may be amplified with a fiber amplifier 535 in some implementations. The fiber amplifier for the output signals may be a same type as the input fiber amplifier 525, or may be a different type. For embodiments in which optical power losses in the optical read-out circuit 100 are small (e.g., less than 10 dB), one or both of the fiber amplifiers 525, 535 may not be used. If a fiber amplifier is used, an amplified spontaneous emission filter 540 may be used to filter the output optical signals. The output optical signals may then be converted to electrical signals by detection apparatus 550.

The detection apparatus 550 can include one or more photodetectors. When only one carrier wave is used, the detection apparatus may comprise one photodetector arranged to receive an optical signal from an end of the output optical fiber 108. When a plurality of carrier waves having different wavelengths are used, the detection apparatus can include a wavelength demultiplexer that separates the different carrier waves onto different optical paths such that a plurality of photodetectors can detect separately optical signals encoded on the different carrier waves. Signals from the photodetection apparatus 550 can be output to one or more low noise amplifiers 560 and signal processing electronics 570.

An example of an optical read-out system that includes WDM is depicted in FIG. 5B. Each cryogenic device (SNSPDs in the illustration) drives a different optical modulator, each tuned to a specific carrier wavelength of the WDM grid. The WDM carriers may be generated by a laser array at room temperature and transported into and from of the cryostat with a single optical fibers that couple to the bus waveguide inside the cryostat. At the output of the cryostat, a demultiplexer and photodetector array can be used to detect signals from the different carrier wavelengths independently.

An example cryogenic optical modulator 110 was fabricated for operation in a cryostat with a superconducting nanowire single-photon detector (SNSPD) 620. The arrangement of the devices is illustrated in FIG. 6A. The devices are fabricated on separate chips and placed in a cryostat for operation, though they could be fabricated on a same chip. The SNSPD 620 contains a single nanowire formed from superconducting material that is microfabricated in a serpentine pattern to fill a circular detection area. A first bias current $I_{b1}$ is applied to the SNSPD during operation and flows through the superconducting wire essentially unimpeded. The SNSPD is capacitively coupled (through capacitor $C_1$) to the bias circuitry of the optical modulator 110. The value of the capacitor $C_1$ can be between 10 pF and 500 pF. A second bias current $I_{b2}$ is applied to the optical modulator during operation to forward bias the modulator. For some measurement, the bias current $I_{b2}$ can be reversed to reverse bias the optical modulator 110.

During operation, when no photons are incident on the SNSPD, bias current $I_{b1}$ flows through the SNSPD's nanowire essentially unimpeded as depicted in the illustration of FIG. 6B, since the nanowire is superconducting along its length. When a photon strikes the nanowire, it can locally warm the nanowire enough such that the bias current $I_{b1}$ exceeds the critical current at the location of the photon absorption. As a result, a resistive hotspot forms in the nanowire of the SNSPD that temporarily diverts bias current $I_{b1}$ to the optical modulator 110, as depicted in FIG. 6C. The resistance of the hotspot can be between 500Ω and 15 kΩ for some superconducting devices, and may be more in some cases. The current $I_{b1}$ is diverted until the nanowire cools and returns to its superconducting state, as depicted in FIG. 6D. A resulting current pulse is delivered to the optical modulator 110 that injects electrons into the modulator's waveguide, which shifts the resonant wavelength of the modulator and modulates the intensity of the carrier wave in the bus waveguide 105. A passive reset branch 630 comprising a series inductor $L_1$ and resistor $R_1$ can be included to facilitate relaxation of the SNSPD back to its superconducting state. The resistor $R_1$ can be between 10Ω and 100Ω. The inductance $L_1$ can be between 1 microhenry (μH) and 20 μH.

FIG. 6B, FIG. 6C, and FIG. 6D show an example of an optical read-out circuit and its operation principle for a specific superconducting device: an SNSPD. A decoupling capacitor ($C_{DECOUPLING}$=100 pF, for example) allows for separate DC biases to the modulator and the SNSPD while coupling the AC signal generated by the SNSPD into the modulator. When the SNSPD is superconducting, it provides a low impedance path to ground so the bias current flows through it as shown in FIG. 6B. After the SNSPD absorbs a photon, it develops a hotspot and becomes resistive (~12 kΩ), diverting most of the current to the optical modulator and producing a voltage pulse that drives the modulator. This generates a shift of the modulator's resonant wavelength, changing the intensity of the transmitted light through the bus waveguide as shown in FIG. 6C. A reset circuit ($L_{RESET}$=8 μH, $R_{RESET}$=50Ω, for example) provides a low-impedance path to ground, diverting any leftover current from the nanowire, allowing for the hotspot to thermally relax and for the SNSPD to return to its superconducting state as shown in FIG. 6D.

The example optical modulator 110 is formed from silicon as a microring modulator and is designed to work at a wavelength of 1550 nm. The modulator has an outer radius of 10 μm, is 1.7 μm wide and roughly 100 nm thick. The chip was fabricated using a commercial high-performance 45 nm complementary metal-oxide semiconductor (CMOS) silicon-on-insulator (SOI) process, without any modification to the process flow, in what is known as zero-change CMOS. The microring is formed in the crystalline-silicon layer that lies on the insulator (oxide), and standard CMOS implants used for transistor fabrication are used to make the p-type and n-type regions that form the interleaved p-n junctions, complying with all the foundry design rules. Such fabrication provides a low cost, highly scalable photonic platform that can be monolithically integrated with electronics. By exploiting the maturity of this CMOS platform, the possibility of building large arrays of cryogenic optical modulators for high throughput readout of large cryogenic systems in a cost effective way is possible.

A printed circuit board (PCB) is employed to interface with the modulator and SNSPD chips. A bottom layer of the PCB can be gold plated partially or completely to increase thermal contact to a cold head in the cryostat and ensure correct thermalization of the modulator 110 and cryogenic device (SNSPD 620). A FR-4 dielectric thickness of 3.2 mm can be used to reduce parasitic capacitance from the PCB. Air-coil inductors, silicon capacitors and thin film resistors can be used to ensure performance at cryogenic temperatures. Bond pads can be included on the PCB and modulator chip to allow connection to the modulator and SNSPD chip through wire bonds. Aluminum was used for the SNSPD, whereas gold wire bonds were used for the modulator. For alternative embodiments, it is possible to integrate all the passive components in the CMOS chip instead of putting them on a PCB. Such integration would avoid interfacing with discrete components mounted on a PCB and improve performance of the optical read-out system.

A challenging aspect of fiber-based cryogenic optical read-out is reliably, robustly, and repeatably attaching the optical fiber to the chip. The fiber should survive the thermal stresses associated with cooling from room temperature. Some embodiments may comprise a CMOS chip that uses vertical grating couplers designed for a 5 μm mode field diameter (MFD), for example, to couple light into and out of the modulator chip. These structures have misalignment tolerances of about 1 μm. Thus, the fiber attachment should maintain the fiber tip position within 1 μm of its desired position throughout the whole process of placing the system into the cryostat and cooling it down to 3.6 K.

Angle-polished fibers matched to the design angle of the grating couplers can be glued to the chip using Norland Optical Adhesive 88 (NOA 88) after aligning the fibers to the grating couplers with micropositioners. First, a small amount of NOA can be deposited and cured at the fiber tip to ensure it was correctly held in place. Second, a large amount of NOA can be deposited away from the tip to serve as stress relief and to ensure that any movement of the rest of the fiber does not affect the highly sensitive fiber tip. A 365 nm UV LED can be used to cure the adhesive, which can then remain at room temperature for 24 hours to ensure robust adhesion.

Under optimal conditions, alignment of SMF-28 fibers with a 10 μm MFD to the grating couplers in the CMOS chip results in 10 dB insertion loss per grating coupler. Due to tolerances in the polish angle and non-perfect alignment, additional losses of around 3.5 dB were incurred after curing of the NOA adhesive for the example modulator 110 of FIG. 6A. Using optimized grating couplers and a better polish angle control, total insertion losses could be reduced from 30 dB to about 3-5 dB after cooling down to cryogenic temperatures.

The example modulator 110 and SNSPD were both operated on the second stage of a two-stage Gifford-McMahon (GM) cryocooler and arranged in an optical read-out system like that shown in FIG. 5A. The output optical fiber 108 from the cryostat was connected to a high-speed photodetector (New Focus 1544B), and the resulting electrical signal was amplified using a low noise amplifier (Mini Circuits ZKL 1R5+). A low pass filter was then used to filter out high frequency noise. The filter's output was connected either to a high speed oscilloscope (Agilent DSO81204A) or a pulse counter (Agilent 53131A), depending on the measurement. To overcome the high optical insertion loss of 30 dB coming from the non-optimized grating couplers, an erbium-doped fiber amplifier (EDFA) (JDSU Erfa 1215) was used before the cryostat input to amplify the light coming from a C band tunable laser (New Focus TLB-6600), and a variable optical attenuator (Ando AQ8201-31) was used to control the optical power delivered to the input optical fiber 102 and passing into the cryostat. An additional EDFA followed by a narrowband optical filter (Agiltron FOTF) that filtered out amplified spontaneous emission (ASE) noise were used at the output of the cryostat before going into the photodetector. A UV laser (PicoQuant LDH-P-C-375) followed by a chain of optical filters was used to control the amount of UV light delivered to the SNSPD.

One concern about operating the optical modulator 110 at the same temperature as the SNSPD 620 was the possibility of thermal crosstalk between the modulator and the SNSPD. In operation, the modulator could be at a temperature higher than that of the cryogenic environment (which was around 3.6 K) for two reasons: (1) Ohmic heating resulting from the forward bias operation of the modulator and (2) free carrier absorption. Additionally, high input optical powers could also result in an increase in the temperature of the optical modulator above that of the SNSPD. Excessive heating could adversely affect the operation of the SNSPD, since the SNSPD's switching current depends strongly on its temperature.

FIG. 7A shows a typical readout waveform from the SNSPD/optical modulator system recorded using a high-speed oscilloscope. Each pulse represents a single photon incident on the SNSPD that causes intensity modulation of the carrier wave in the readout optical signal. The carrier wave input was 1 mW of 1550 nm light, corresponding to about 30 μW in the bus waveguide 105 after losses associated with an input grating coupler (with 15 dB loss). A DC bias current $I_{b1}$ used for the SNSPD was essentially 6 μA, while the modulator was biased with a DC current $I_{b2}$ of essentially 40 μA, corresponding to a modulation efficiency of 10,000 pm/V, a 45 μW electrical power dissipation, and an input resistance of 500Ω.

FIG. 7B shows the waveform of a readout pulse generated by a single-photon detection event. The signal differs from typical SNSPD pulses and shows slowly decaying oscillations due mainly to the parasitic capacitance introduced by the SNSPD chip, which is not optimized to reduce stray capacitance. The peak-to-peak amplitude of the driving electrical signal (differential voltage ΔV) from the SNSPD and applied to the optical modulator 110 is approximately 2 mV, which was deduced from a simulation of the system. Because of forward bias operation of the modulator 110, optical modulation is achieved with such a small signal which would not be detectable if the modulator were reverse biased. With such a small amplitude of the applied differential voltage, the AC electrical power is at least two orders of magnitude lower than the DC electrical power. Thus, the DC electrical power dominates the total electrical power dissipation in our readout.

The total AC electrical power dissipation can be written as:

$$P_{AC}=C^*\Delta V^2{}^*f \quad (1)$$

In the above equation, C corresponds to the input capacitance of the modulator, which is <200 pF for the example modulator. ΔV is the peak to peak amplitude of the applied driving signal, which is <2 mV. Finally, f is the frequency at which readout pulses are generated. For a frequency f=1× $10^9$ readout pulses per second, the total AC power dissipation is <0.8 μW, two orders of magnitude lower than the DC power, which is 20-40 μW.

A frequency-response bandwidth of 1.5 GHz was measured for the modulator, which is fast enough to respond to the SNSPD signal and is faster than the 500 MHz bandwidth electrical amplifiers typically used for SNSPD readout. By measuring the number of pulse counts for different UV powers incident on the SNSPD, it was found that the optical read-out circuit and system behaved linearly with incident power for at least an order of magnitude change in incident UV power.

The results from the example modulator demonstrate readout of a superconducting device using a cryogenic optical modulator. The example modulator also demonstrates that low input impedance and high modulation efficiency are achievable in forward-biased semiconductor modulators at cryogenic temperatures. With 45 μW electrical power dissipation, the optical read-out circuit presents a 100-fold lower heat load than typical electrical readout schemes or optical readout using a pre-amplified laser. The present results are limited by high optical coupling losses from fiber to waveguide, and improvements to the optical coupling are readily possible. Reduced coupling losses could result in a read-out limited only by the internal efficiency of the SNSPD and could reduce the necessary input carrier-wave optical power from 1 mW to 5 μW. This can allow scalable, massively parallel, low-power, high-throughput communication between cryogenic and room temperature environments, addressing one of the key remaining challenges for the wide adoption of cryogenic technologies.

Speed of the example modulator 110 and optical read-out circuit was also investigated. As described above, the p-n junctions and series resistance of the optical modulator are expected to play significant roles in determining the speed of the optical read-out circuit. Electron-hole recombination lifetimes exhibit small changes as temperature of the modulator drops—bimolecular recombination increases whereas Shockley-Read-Hall (defect-assisted) recombination may decrease slightly. As a result, a measured frequency-response bandwidth in forward bias is relatively independent of temperature: 0.9 GHz at 300 K versus 1.5 GHz at 4 K.

FIG. 8A plots the frequency response for the example forward-biased modulator and optical read-out system at room temperature RT and 4K. The measurements suggest that the carrier lifetime decreases slightly at low temperatures, which may be explained by an increase in both radiative and Shockley-Read-Hall recombination.

On the contrary, in reverse bias the bandwidth is limited by the p-n junctions' resistance and capacitance (RC time-constant), which depend on the number of ionized dopants and therefore on temperature. As carrier freeze-out occurs, the RC time constant of the modulator increases, and the frequency-response bandwidth decreases precipitously: 9 GHz at 300 K versus 0.2 GHz at 4 K, as plotted for the two temperatures in FIG. 8B.

Modulation efficiency of the example optical modulator 110 was measured as a function of forward-bias voltage. FIG. 9 shows the modulation efficiency increases sharply as a function of voltage both at room temperature (RT) and 3.6K.

FIG. 10 shows a circuit schematic used to model the SNSPD/optical modulator system. A 100 pF decoupling capacitor (DEC_CAP) 1010 is added between the modulator 1020 and the SNSPD 1030 to allow for different DC bias points and let the AC signal generated by the SNSPD drive the modulator. Inductive AC blocks 1042, 1044 at the modulator and SNSPD bias inputs prevent time-varying signals from being coupled back into the bias sources, and 1 nF capacitors to ground are added to filter out high frequency noise in the DC bias supplies. The inductive AC blocks, decoupling capacitor, load resistor, and passive reset branch 1050 can be implemented in a printed circuit board (PCB), to which the CMOS chip and the SNSPD are wire-bonded. Due to the modulator differential resistance being around 500Ω, the 5 kΩ load resistor essentially behaves as an open circuit and does not have any effect in the circuit operation. The values listed for electrical components in the drawings are example values for the implemented system and may change for different modulator designs and different cryogenic devices 120.

Due to 30 dB optical coupling losses and the use of EDFAs at the input and output of the cryostat for the example optical read-out system, signals read out from the modulator exhibited low signal-to-noise ratio (SNR). A Gaussian distribution was fitted to the noise in measured data from the optical read-out system, and the signal power was estimated by integrating a single readout pulse. From these two calculations, the SNR for the example system was estimated to be approximately 1.83. For low SNR, digital filtering of the readout waveforms can be employed to compensate for this low raw signal quality.

FIG. 11A and FIG. 11B depict results of signal processing. FIG. 11A plots a raw, single pulse received from the optical read-out circuit (light-shaded, noisy trace). The plot also includes a darker trace representing an average of 500 optical pulses detected from the modulator, and a filtered version of the averaged pulse. The averaging of the pulses reduces noise and increases the SNR. After the averaging, a low frequency sinusoidal component at 1 MHz can be observed on the pulse. This modulation can be removed, for example, by digital filtering. According to some embodiments, a fast Fourier transform (FFT) of the detected signals or the averaged signal can be computed and the amplitude value at, or one or more amplitude values near, the unwanted modulation (1 MHz for the example system) can be removed and substituted with interpolated values computed from two or more nearest neighbors. FIG. 11B plots the FFTs of the averaged signal before and after digital filtering is applied.

The resulting time-domain waveform is the averaged and filtered trace in FIG. 11A. Low-pass digital filtering can be employed additionally to remove high-frequency noise above, for example, a third or forth harmonic of the signal's peak frequency component (e.g., above about 30 MHz for the example system).

FIG. 12 shows a raw, single pulse (and its filtered version) detected from a modulator operated with a forward bias of 25 μA and an SNSPD biased at 6 μA. A decrease in the bias current of the modulator results in a smaller amplitude pulse due to a reduced modulation efficiency. A 25 μA bias current corresponds to a modulation efficiency close to 4000 pm/V, which reduces the peak to peak amplitude to around 150 mV (compared to the 200 mV amplitude obtained with 40 μA bias and shown in FIG. 7B).

FIG. 13A shows the number of counts recorded with a pulse counter for different UV powers incident on the SNSPD and for different SNSPD bias currents. The modulator bias current was kept at 40 μA and the carrier-wave optical power coupled into the input optical fiber was approximately 1 mW. Above a bias current 6.6 μA, the SNSPD undergoes relaxation oscillations and is no longer photosensitive.

The plots of FIG. 13B show that the number of generated pulses depends linearly on the UV optical power hitting the SNSPD for a range of SNSPD bias currents. The internal efficiency of the SNSPD decreases for decreasing bias currents. Without being bound by any particular theory, the decrease in internal efficiency explains why the number of recorded counts decreases for lower bias currents.

The solid lines in FIG. 13B plot the expected number of counts for each incident laser power. These lines were calculated by using the number of counts recorded experimentally for the lowest UV laser power $P_{min}$ and assuming a perfectly linear detector. Values were then computed according to the following expression.

$$\text{counts}_{expected}(P_{in}) = P_{in} \frac{\text{counts}_{measured}(P_{min})}{P_{min}} \quad (2)$$

For the example optical read-out system, $P_{min}=25$ nW.

As may be appreciated, pulse counting behavior depends upon the alignment of UV radiation to the SNSPD. Without being bound to a particular theory, the number of counts per second expected from the optical read-out system can be estimated from the number of photons hitting the SNSPD:

$$cps = \eta_{snspd} * \eta_{misalignment} * \frac{P_{int}(r_{snspd})}{P_{int}(r \to \infty)} * \phi_{TOT} \quad (3)$$

where $\phi_{TOT}$ is the total flux of photons, which for a power of 360 nW (the power used to obtain the waveforms shown in FIG. 7A and FIG. 7B) and a wavelength of 373 nm is $7 \times 10^{11}$ photons per second. $\eta_{snspd}=0.7$ and $r_{snspd}=28$ μm are the SNSPD internal efficiency and radius, respectively.

$P_{int}(r)$ is the power contained in a circular aperture of radius r by a gaussian beam centered in an SNSPD aperture. For example, which is given by:

$$P_{int}(r) = P_{TOT} * \left(1 - e^{\frac{-2r^2}{w^2}}\right) \quad (4)$$

$P_{TOT}$ is the total power of the gaussian beam, and w is the beam waist radius, which can be approximated as:

$$w(d) = NA \cdot d \qquad (5)$$

NA is the numerical aperture of the multimode fiber used to launch the UV light and d is the distance between the tip of the fiber and the SNSPD surface. In our case, NA=0.22 and d≈2.5 cm.

$n_{misalignment}$ accounts for the misalignment between the center of the SNSPD and the center of the UV gaussian beam, which decreases the number of photons incident on the SNSPD. $\eta_{misalignment}$ is given by:

$$\eta_{misalignment} = \frac{e^{\frac{-2r_0^2}{w^2}} \int_0^{r_{snspd}} \int_0^{2\pi} r \exp\left(-\frac{2r^2}{w^2}\right) \exp\left(4 r_0 r \frac{\cos(\theta)}{w^2}\right) d\theta dr}{\left(\frac{\pi}{2}\right) w^2 \left(1 - e^{\frac{-2r^2}{w^2}}\right)} \qquad (6)$$

$r_0$ is the distance between the center of the gaussian beam and the center of the SNSPD.

Since the number of photons incident on the SNSPD can be estimated, it is possible to calculate a pulse counting efficiency for a voltage threshold setting for the read-out system's pulse counter. For a bias current of 5 μA applied to the SNSPD in the example system, approximately $2 \times 10^3$ counts per second (cps) are obtained for the threshold setting used on the pulse counter. The detected counts per second translates into a pulse-counting efficiency $\eta \approx 1\%$ for $2 \times 10^5$ photons per second incident on the SNSPD. Without being bound by any particular theory, this low pulse-counting efficiency is due mainly to the 30 dB loss in input-output optical coupling to and from the bus waveguide 105 on the CMOS chip which results in a low SNR. For systems exhibiting a low SNR signal, a higher voltage threshold may be used for the pulse counter to prevent noise events from being counted as readout pulses. The higher threshold can cause the pulse counter to miss real signal pulses (pulses corresponding to a photon detection event) and decreased the pulse counting efficiency.

Readily available improvements in the optical coupling from the input fiber 102 to the modulator chip and from the chip to the output optical fiber 108 would allow for a substantial decrease in required optical power, explained above, and/or a significant improvement in signal-to-noise ratio (SNR). Measurements with the example modulator exhibited a low SNR, which is mainly due to a 30 dB insertion loss introduced by optical coupling in and out of the bus waveguide 105 on the CMOS modulator chip. These high losses are not intrinsic to the technology: grating couplers with greater than 90% efficiency have been demonstrated in a same fabrication process employed to fabricate the example optical read-out system. Thus, using improved grating couplers and a better polish angle control, insertion losses could be reduced to about 3-5 dB after cooling to cryogenic temperatures.

Reducing the optical loss by 25 dB would allow us to obtain the same output signal with 25 dB lower input optical power. Such a reduction in input power would impact the quality of the readout in at least two different ways. First, it would decrease the heat load to the cryostat, reducing the operating temperature of the SNSPD and thus increasing its switching current (from about 7.5 μA to about 9 μA), resulting in a 20% increase in the electrical signal driving the modulator. Assuming a linear dependency between electrical signal and modulation depth, which is a good approximation given the small amplitude signals that develop in the system, the generated readout signal would increase by 20%, improving the SNR. Second, a decrease in the optical coupling loss would eliminate the need for an input EDFA, which would increase the SNR of the readout signal by a factor equal to the noise figure of the amplifier (about 6 dB in this case). Thus, reducing the optical coupling loss could result in a roughly 7 dB increase in the SNR of the read-out signal, which would allow for a much higher pulse counting efficiency of the optical read-out system when operated in pulse-counting mode.

Because of a low SNR for the example read-out system, results were limited by setting a threshold for the pulse counter at a level far enough from the noise floor to avoid false counts from noise events. As a consequence, many of the pulses corresponding to detected photons were not counted because they didn't exceed the pulse counter threshold. Improvements in optical couplers can increase the SNR to about 10. An increase in the SNR would allow for a lower threshold for the pulse counter, which would increase the number of pulses detected and would result in a detection efficiency approaching that of the SNSPD, which is close to 70% for the example SNSPD.

Reducing the series resistance $R_s$ of a cryogenic optical modulator should not have any detrimental effect in its modulation depth, since the differential voltage drop $\Delta V \sim I_{SNSPD} \times R_d$ through the p-n junctions is independent of the series resistance. On the other hand, reducing the series resistance should allow the modulator to present a much lower input impedance to the superconducting device, considerably reducing the impedance mismatch and making the use of the passive reset branch unnecessary.

The above-described optical modulators and methods of operation may be implemented in various configurations. Example configurations of optical modulators are listed below.

(1) An optical modulator for operating in a cryogenic environment, the optical modulator comprising: a plurality of semiconductor junctions formed along a waveguide; and biasing circuitry that is connected to the plurality of semiconductor junctions and configured to receive a voltage or current that forward biases the plurality of semiconductor junctions during operation of the optical modulator.

(2) The optical modulator of configuration (1), wherein the waveguide has an optical path length that corresponds to a specified resonant wavelength for optical modulation by the optical modulator when the optical modulator is at a cryogenic temperature.

(3) The optical modulator of configuration (2), wherein the specified resonant wavelength differs by between 5 nanometers and 20 nanometers from a resonant wavelength of the optical modulator when the optical modulator is at a temperature of 295 K.

(4) The optical modulator of any one of configurations (1) through (3), further comprising a modulation port electrically connected to the plurality of semiconductor junctions and adapted to receive a signal directly from a cryogenically cooled device.

(5) The optical modulator of any one of configurations (1) through (4), wherein the waveguide is formed as a ring resonator or a racetrack resonator.

(6) The optical modulator of any one of configurations (1) through (4), wherein the waveguide is formed in a Mach-Zehnder interferometer.

(7) The optical modulator of any one of configurations (1) through (6), wherein the waveguide comprises silicon and/or silicon germanium semiconductor material.

(8) The optical modulator of configuration (7), further comprising intentional defects in the waveguide that increase carrier recombination speed compared to recombination speed in the waveguide having no defects.

(9) The optical modulator of any one of configurations (1) through (8), wherein the waveguide comprises silicon germanium that is arranged to increase carrier recombination speed compared to the waveguide having no silicon germanium.

(10) The optical modulator of any one of configurations (1) through (9), wherein the waveguide comprises silicon germanium that is arranged to increase sensitivity of refractive index in the waveguide to changes in carrier concentration in the waveguide compared to the waveguide having no silicon germanium.

(11) The optical modulator of any one of configurations (1) through (10), wherein the plurality of semiconductor junctions are formed as radial p-n or p-i-n junctions that extend linearly from a first side of the waveguide across to a second side of the waveguide.

(12) An optical read-out circuit comprising: a plurality of optical modulators as arranged in any one of configurations (1) through (11); and a bus waveguide in optical communication with the plurality of optical modulators.

(13) The optical modulator of any one of configurations (1) through (12), further comprising an integrated heater thermally coupled to the waveguide.

Example methods of operating optical modulators of the above configurations or as included in the below apparatus configurations are listed below.

(14) A method comprising: cooling an optical modulator to a cryogenic temperature;
while the optical modulator is cooled to the cryogenic temperature, forward biasing the optical modulator; and
while the optical modulator is cooled to the cryogenic temperature and forward biased, modulating an optical carrier wave with the optical modulator.

(15) The method of (14), wherein the forward biasing of the optical modulator comprises biasing the optical modulator with a forward bias current between approximately 0.1 microamps and approximately 50 microamps.

(16) The method of (14) or (15), wherein the modulating of the optical carrier wave comprises driving the optical modulator with a signal from a cryogenically cooled device.

(17) The method of any one of (14) through (16), wherein the modulating of the optical carrier wave comprises operating the optical modulator with a modulation efficiency between approximately 500 picometers per volt and approximately 10,000 picometers per volt.

(18) The method of any one of (14) through (17), wherein the modulating of the optical carrier wave comprises driving the optical modulator with a peak-to-peak voltage having an amplitude of not more than approximately 10 millivolts.

(19) The method of any one of (14) through (18), wherein the modulating of the optical carrier wave comprises dissipating not more than approximately 50 microwatts electrical power by the optical modulator.

Example apparatus configurations that include forward-biased optical modulators are listed below. Dependent aspects of the above optical modulator configurations (2) through (13) may be combined with the following apparatus configurations.

(20) An apparatus for operating in a cryogenic environment, the apparatus comprising: a device configured to produce an output signal during operation in the cryogenic environment; an optical modulator that is operably coupled to the device and configured to modulate an optical carrier wave in response to receiving the output signal during operation in the cryogenic environment; a plurality of semiconductor junctions formed along a waveguide of the optical modulator; and biasing circuitry configured to forward bias the plurality of semiconductor junctions during operation of the apparatus, wherein the optical modulator has a real input impedance of not more than 1000 ohms at 1 gigahertz.

(21) The apparatus of configuration (20), further comprising: a chamber containing the device and the optical modulator in which the device and the optical modulator can be cooled to a cryogenic temperature; and an optical fiber, in optical communication with the optical modulator, arranged to couple the optical carrier wave from the optical modulator to a detector located outside the chamber.

(22) The apparatus of configuration (21), further comprising: an optical source and optical components arranged to couple radiation from the optical source to the optical modulator; and a wavelength locker coupled to the optical source and configured to lock a wavelength of the radiation to a resonant wavelength for the optical modulator.

(23) The apparatus of any one of configurations (20) through (22), wherein the waveguide comprises silicon and/or silicon germanium formed in a circle as a ring resonator or an oval as a racetrack resonator.

(24) The apparatus of any one of configurations (20) through (23), wherein the optical modulator comprises two waveguides comprising silicon and/or silicon germanium formed in a Mach-Zehnder interferometer.

(25) The apparatus of any one of configurations (20) through (24), wherein the device comprises a superconducting nanowire single-photon detector, a superconducting quantum interference device, a Josephson junction, a traveling wave amplifier, a low-noise amplifier, a cooled sensor, or a cooled imaging array.

(26) The apparatus of any one of configurations (20) through (25), wherein the output signal encodes a quantum state of a qubit.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The terms "about," "approximately," and "substantially" may be used to refer to a value (such as a target value or values used in numerical ranges), and are intended to encompass the referenced value plus and minus variations that would be considered to be within the scope of the inventive embodiments. The amount of variation could be as much as ±5% in some embodiments, as much as ±10% in some embodiments, and yet as much as ±20% of the listed value(s) in some embodiments. The term "essentially" is used to refer to a value that may vary by no more than ±3%.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An optical modulator for operating in a cryogenic environment, the optical modulator comprising:
   a plurality of semiconductor junctions formed along a waveguide;
   biasing circuitry that is connected to the plurality of semiconductor junctions and configured to receive a voltage or current that provides a constant forward bias to the plurality of semiconductor junctions during operation of the optical modulator in the cryogenic environment; and
   a modulation port that is electrically connected to the plurality of semiconductor junctions to receive a modulation signal that modulates a refractive index in the waveguide.

2. The optical modulator of claim 1, wherein the waveguide has an optical path length that corresponds to a specified resonant wavelength for optical modulation by the optical modulator when the optical modulator is at a cryogenic temperature.

3. The optical modulator of claim 2, wherein the specified resonant wavelength differs by between 5 nanometers and 20 nanometers from a resonant wavelength of the optical modulator when the optical modulator is at a temperature of 295 K.

4. The optical modulator of claim 1, wherein the modulation port is adapted to receive a signal directly from a cryogenically cooled device.

5. The optical modulator of claim 1, wherein the waveguide is formed as a ring resonator or a racetrack resonator.

6. The optical modulator of claim 1, wherein the waveguide is formed in a Mach-Zehnder interferometer.

7. The optical modulator of claim 1, wherein the waveguide comprises silicon and/or silicon germanium semiconductor material.

8. The optical modulator of claim 7, further comprising intentional defects in the waveguide that increase carrier recombination speed compared to recombination speed in the waveguide having no defects.

9. The optical modulator of claim 1, wherein the waveguide comprises silicon germanium that is arranged to increase carrier recombination speed compared to the waveguide having no silicon germanium.

10. The optical modulator of claim 1, wherein the waveguide comprises silicon germanium that is arranged to increase sensitivity of refractive index in the waveguide to changes in carrier concentration in the waveguide compared to the waveguide having no silicon germanium.

11. The optical modulator of claim 1, wherein the plurality of semiconductor junctions are formed as radial p-n or p-i-n junctions that extend linearly from a first side of the waveguide across to a second side of the waveguide.

12. An optical read-out circuit comprising:
a plurality of optical modulators as claimed in claim 1; and
a bus waveguide in optical communication with the plurality of optical modulators.

13. The optical modulator of claim 1, further comprising an integrated heater thermally coupled to the waveguide.

14. A method comprising:
cooling an optical modulator to a cryogenic temperature;
while the optical modulator is cooled to the cryogenic temperature, applying a constant forward bias current to a plurality of semiconductor junctions formed along a waveguide of the optical modulator, wherein the constant forward bias current has a value between approximately 0.1 microamps and approximately 50 microamps; and
while the optical modulator is cooled to the cryogenic temperature and the plurality of semiconductor junctions is forward biased, applying a time-varying signal to the plurality of semiconductor junctions to modulate an optical carrier wave with the optical modulator based on the time-varying signal.

15. The method of claim 14, wherein the time-varying signal is from a quantum computing device.

16. The method of claim 14, wherein the modulating of the optical carrier wave comprises driving the optical modulator with the time-varying signal from a cryogenically cooled device.

17. The method of claim 14, wherein the modulating of the optical carrier wave comprises operating the optical modulator with a modulation efficiency between approximately 500 picometers per volt and approximately 10,000 picometers per volt.

18. The method of claim 14, wherein the modulating of the optical carrier wave comprises driving the optical modulator with a peak-to-peak voltage having an amplitude of not more than approximately 10 millivolts.

19. The method of claim 14, wherein the modulating of the optical carrier wave comprises dissipating not more than approximately 50 microwatts electrical power by the optical modulator.

20. An apparatus for operating in a cryogenic environment, the apparatus comprising:
a device configured to produce an output signal during operation in the cryogenic environment;
an optical modulator that is operably coupled to the device and configured to modulate an optical carrier wave in response to receiving the output signal during operation in the cryogenic environment;
a plurality of semiconductor junctions formed along a waveguide of the optical modulator; and
biasing circuitry configured to apply a constant forward bias to the plurality of semiconductor junctions during operation of the optical modulator in the cryogenic environment, wherein the constant forward bias provides a modulation efficiency of the optical modulator between 100 picometers per volt and 15,000 picometers per volt.

21. The apparatus of claim 20, further comprising:
a chamber containing the device and the optical modulator in which the device and the optical modulator can be cooled to a cryogenic temperature; and
an optical fiber, in optical communication with the optical modulator, arranged to couple the optical carrier wave from the optical modulator to a detector located outside the chamber.

22. The apparatus of claim 21, further comprising:
an optical source and optical components arranged to couple radiation from the optical source to the optical modulator; and
a wavelength locker coupled to the optical source and configured to lock a wavelength of the radiation to a resonant wavelength for the optical modulator.

23. The apparatus of claim 20, wherein the waveguide comprises silicon and/or silicon germanium formed in a circle as a ring resonator or an oval as a racetrack resonator.

24. The apparatus of claim 20, wherein the optical modulator comprises two waveguides comprising silicon and/or silicon germanium formed in a Mach-Zehnder interferometer.

25. The apparatus of claim 20, wherein the device comprises a superconducting nanowire single-photon detector, a superconducting quantum interference device, a Josephson junction, a traveling wave amplifier, a low-noise amplifier, a cooled sensor, or a cooled imaging array.

26. The apparatus of claim 20, wherein the output signal encodes a quantum state of a qubit.

* * * * *